US011848767B2

(12) United States Patent
Circosta et al.

(10) Patent No.: US 11,848,767 B2
(45) Date of Patent: Dec. 19, 2023

(54) PRIVACY-PRESERVING ELECTRONIC PUBLICATION AND SUBSCRIPTION SYSTEMS

(71) Applicant: Apple Inc., Cupertino, CA (US)

(72) Inventors: Nicholas J. Circosta, Mountain View, CA (US); Elliot T. Garner, Cupertino, CA (US); Aniket A. Zamwar, Milpitas, CA (US); Yevgeni Pekurovsky, Cupertino, CA (US); Jared A. Crawford, Apex, NC (US); Frederic Jacobs, St. Sulpice (CH); Justin S Titi, San Jose, CA (US); Matthew E. Shepherd, Mountain View, CA (US); Jose A. Lozano Hinojosa, Santa Clara, CA (US); Sean Geiger, San Francisco, CA (US); Ahmed M. Bashir, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/722,296

(22) Filed: Apr. 15, 2022

(65) Prior Publication Data

US 2022/0385738 A1 Dec. 1, 2022

Related U.S. Application Data

(60) Provisional application No. 63/195,670, filed on Jun. 1, 2021.

(51) Int. Cl.
*H04L 67/55* (2022.01)
*H04L 9/32* (2006.01)
*H04L 9/40* (2022.01)
*H04L 67/63* (2022.01)

(52) U.S. Cl.
CPC ............ *H04L 67/55* (2022.05); *H04L 9/3297* (2013.01); *H04L 63/101* (2013.01); *H04L 67/63* (2022.05)

(58) Field of Classification Search
CPC ........ H04L 67/55; H04L 67/141; H04L 67/10
See application file for complete search history.

(56) References Cited

U.S. PATENT DOCUMENTS

| 8,234,559 | B2 * | 7/2012 | Cox | H04L 69/28 |
|---|---|---|---|---|
| | | | | 215/229 |
| 8,856,289 | B2 | 10/2014 | Ansari et al. | |
| 10,110,631 | B2 | 10/2018 | Bauer et al. | |
| 10,666,712 | B1 * | 5/2020 | Dandekar | H04L 67/10 |
| 10,812,600 | B1 * | 10/2020 | Naaman | H04L 67/142 |

(Continued)

*Primary Examiner* — Chirag R Patel
(74) *Attorney, Agent, or Firm* — BAKERHOSTETLER

(57) ABSTRACT

Aspects of the subject technology provide for privacy-preserving electronic publication and subscription. A publisher device may establish a publication channel with a publication server and receive a channel identifier and a channel ownership token for the channel. The publisher device may provide the channel identifier and a key for the publication channel to a subscriber device. The publisher device may publish data encrypted using the key to the publication server, the subscriber device may obtain the encrypted published data from the server using the channel identifier, and may decrypt the published data using the key obtained from the publisher device. The published data may include status information for a user of the publisher device, in some examples.

19 Claims, 13 Drawing Sheets

(56) References Cited

U.S. PATENT DOCUMENTS

| | | | |
|---|---|---|---|
| 2004/0001498 A1* | 1/2004 | Chen | H04L 63/0263 370/392 |
| 2011/0320538 A1* | 12/2011 | Ickman | G06F 9/542 709/206 |
| 2012/0135723 A1* | 5/2012 | Ramo | G06F 16/9535 455/418 |
| 2015/0100664 A1* | 4/2015 | Flack | H04L 67/2885 709/213 |
| 2019/0058772 A1* | 2/2019 | Ruiz-Meraz | G06F 9/542 |
| 2019/0104179 A1* | 4/2019 | Falco | H04L 67/568 |
| 2022/0353247 A1* | 11/2022 | Bastos | H04L 63/0838 |

* cited by examiner

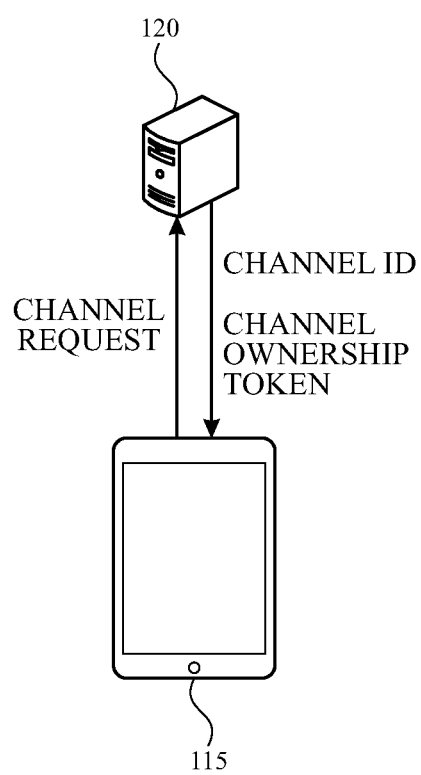 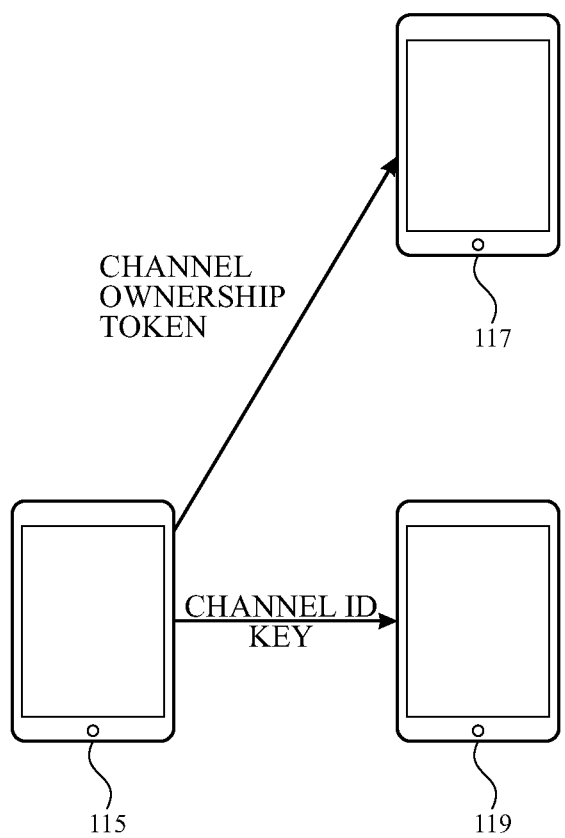
FIG. 2
FIG. 3

PRIVACY-PRESERVING ELECTRONIC PUBLICATION AND SUBSCRIPTION SYSTEMS

CROSS REFERENCE TO RELATED APPLICATIONS

This application claims the benefit of priority to U.S. Provisional Patent Application No. 63/195,670, entitled "Privacy-Preserving Electronic Publication and Subscription Systems," filed on Jun. 1, 2021, the disclosure of which is hereby incorporated herein in its entirety.

TECHNICAL FIELD

The present description relates generally to electronic communications, including, for example, privacy-preserving electronic publication and subscription systems.

BACKGROUND

Publishers, such as news organizations, often have subscribers that have signed up to receive news alerts on their personal electronic devices. These alerts are generated at publisher servers and pushed down from publisher servers for display at a personal electronic device. In order to provide this subscription service, the publisher may maintain a record of each and every subscriber, and/or a record of which alerts have been delivered to each and every subscriber at any given time.

BRIEF DESCRIPTION OF THE DRAWINGS

Certain features of the subject technology are set forth in the appended claims. However, for purpose of explanation, several embodiments of the subject technology are set forth in the following figures.

FIG. 2 illustrates an example exchange of information for establishing a publication channel in accordance with one or more implementations.

FIG. 3 illustrates an example exchange of information for providing access to a publication channel by a subscriber device in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology disclosed herein provide privacy-preserving electronic publication and subscription systems in which a server can receive encrypted information for publication, and distribute the encrypted information to subscribed devices, without allowing the server to access the encrypted information or track who is subscribed to which channels. The disclosed systems can be beneficial from the perspective of users as their privacy is preserved with respect to the server. The disclosed systems can also be beneficial from the perspective of the server, as the server is not required to expend the energy, storage, and processing resources for maintaining a list of subscribers for each and every publication channel, and a status of the delivered messages for each and every publication channel and each and every subscribed device.

Figure 1:
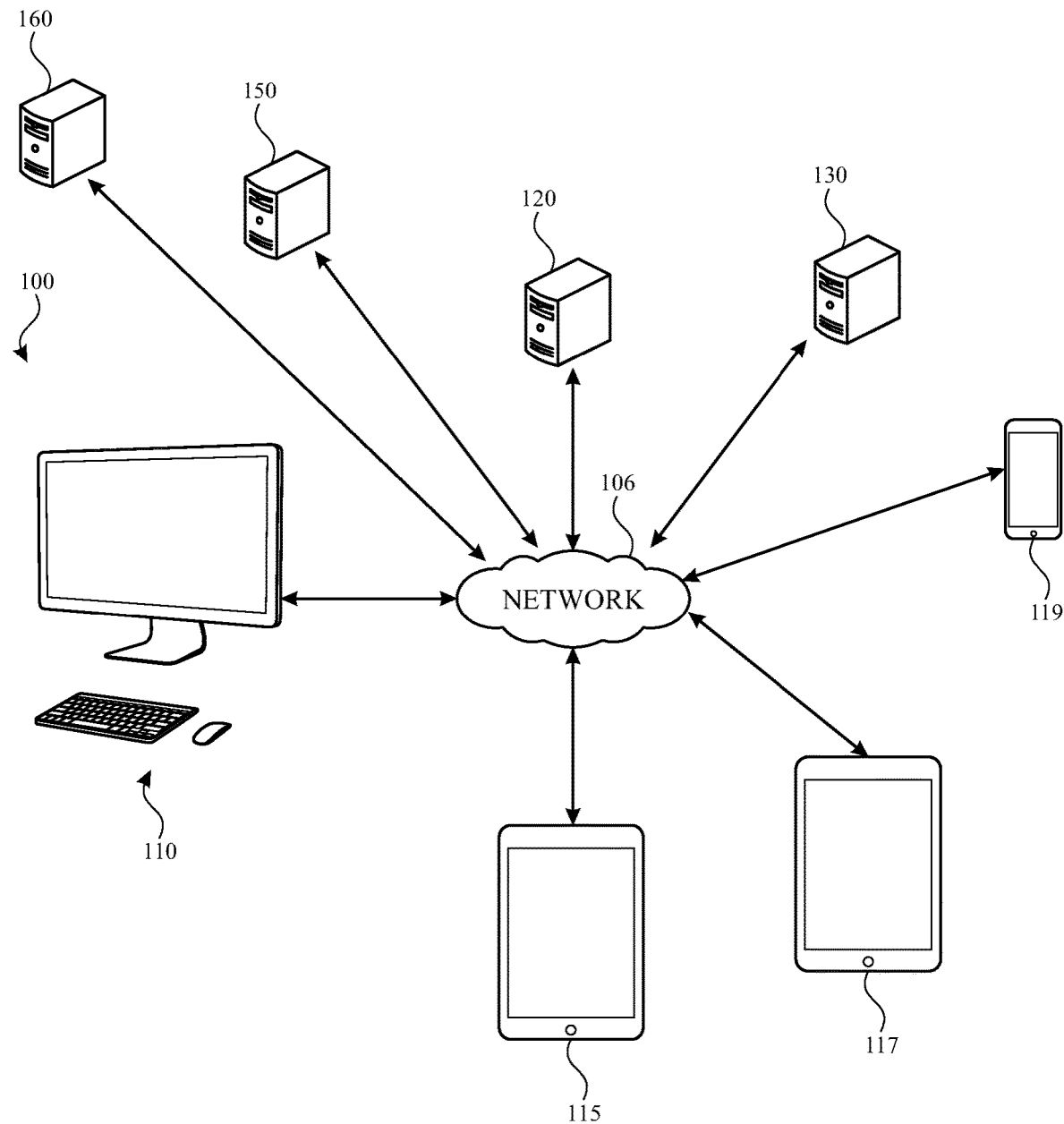
FIG. 1 illustrates an example network environment for privacy-preserving publication and subscription in accordance with one or more implementations.

FIG. 1 illustrates an example network environment 100 in which publication and subscription (sometimes referred to herein as pub-sub or Pub Sub) may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, an electronic device 117, an electronic device 119, a server 120, a server 130, a server 150, and one or more publisher servers such as publisher server 160. The network 106 may communicatively (directly or indirectly) couple the electronic device 110, the electronic device 115, the electronic device 117, the electronic device 119, the server 120, the server 130, the server 150, and/or the publisher server 160. In one or more implementations, the network 106 may be an interconnected network of devices that may include, or may be communicatively coupled to, the Internet. For explanatory purposes, the network environment 100 is illustrated in FIG. 1 as including the electronic device 110, the electronic device 115, the electronic device 117, the electronic device 119, the server 120, the server 130, the server 150, and/or the publisher server 160; however, the network environment 100 may include any number of electronic devices and/or any number of servers communicatively coupled to each other directly or via network 106.

The electronic device 110 may be, for example, a desktop computer, a portable computing device such as a laptop computer, a smartphone, a peripheral device (e.g., a digital camera, headphones), a tablet device, standalone videoconferencing hardware, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 110 may include a system process for managing publications and/or subscriptions and/or one or more applications that generate and/or consume publications. In FIG. 1, by way of example, the electronic device 110 is depicted as a desktop computer. The electronic device 110 may be, and/or may include all or part of, the electronic system discussed below with respect to FIG. 16.

The electronic device 115 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 115 may include a system process for managing publications and/or subscriptions and/or one or more applications that generate and/or consume publications. In FIG. 1, by way of example, the electronic device 115 is depicted as a tablet device with a touchscreen. In one or more implementations, the electronic device 115 may be, and/or may include all or part of, the electronic device discussed below with respect to the electronic system discussed below with respect to FIG. 16.

The electronic device 117 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 117 may include a system process for managing publications and/or subscriptions and/or one or more applications that generate and/or consume publications. In FIG. 1, by way of example, the electronic device 117 is depicted as a tablet device with a touchscreen. In one or more implementations, the electronic device 117 may be, and/or may include all or part of, the electronic device discussed below with respect to the electronic system discussed below with respect to FIG. 16.

The electronic device 119 may be, for example, a portable computing device such as a laptop computer, a smartphone, a peripheral device (e.g., a digital camera, headphones), a tablet device, a wearable device such as a watch, a band, and the like, any other appropriate device that includes, for example, one or more wireless interfaces, such as WLAN radios, cellular radios, Bluetooth radios, Zigbee radios, near field communication (NFC) radios, and/or other wireless radios. In one or more implementations, the electronic device 119 may include a system process for managing publications and/or subscriptions and/or one or more applications that generate and/or consume publications. In FIG. 1, by way of example, the electronic device 119 is depicted as a smart phone with a touchscreen. In one or more implementations, the electronic device 119 may be, and/or may include all or part of, the electronic device discussed below with respect to the electronic system discussed below with respect to FIG. 16.

In one or more implementations, one or more servers such as the server 120, the server 130, and/or the server 150 may perform operations for managing publications and subscriptions for various electronic devices such as the electronic device 110, the electronic device 115, the electronic device 117, and/or the electronic device 119. In one or more implementations, the server 130 may store account information associated with the electronic device 110, the electronic device 115, the electronic device 117, the electronic device 119, and/or users of those devices. In one or more implementations, one or more servers such as the server 120 and/or the server 150 may provide resources for managing publications and/or subscriptions for the electronic device 110, the electronic device 115, the electronic device 117, the electronic device 119, and/or the publisher server 160.

FIG. 2 schematically illustrates a device (e.g., electronic device 115) requesting establishment of a publication channel from a publication server (e.g., server 120). As shown in FIG. 2, the electronic device 115 may provide a channel request to the server 120 and may receive a channel ownership token from the server 120. As shown, the server 120 may also provide a channel identifier (channel ID) to the electronic device 115. In one or more implementations, in order to establish a publication channel, the electronic device 115 may provide (e.g., in or with the channel request) authentication information for an account of a user of the electronic device 115 to the server 120. The server 120 may authenticate (e.g., alone or in communication with one or more other servers, such as the server 130) the account using the authentication information, and generate the channel identifier and the channel ownership token.

In one or more implementation, the server 120 may generate the channel identifier (e.g., a random number or other alphanumeric identifier for the new channel), and may generate the channel token using the channel identifier, a user identifier (e.g., obtained in the authentication information or following authentication of the user requesting establishment of the publication channel), a channel topic for the publication channel (e.g., a topic provided by the electronic device 115 in the channel request), and/or other attributes and/or metadata (e.g., a channel creation timestamp, a channel ownership type, a token version number, or other information associated with the channel). The server 120 may, for example, generate the channel ownership token by generating a string including the channel identifier, the user identifier, the channel topic and/or the other attributes and/or metadata, generating a hash or other transform of the string, and/or encrypting and/or signing the string or the hash or other transform of the string (as examples). Although the channel ownership token is described in various examples herein as being associated with a single user and/or a single user account, it is also appreciated that, in some implementations, a group of users may own a publication channel, and a channel ownership token may be generated using a group identifier for the group or using multiple user identifiers for the multiple users in the group.

As shown in FIG. 3, after receiving the channel identifier and the channel ownership token, the electronic device 115 may provide a key corresponding to the channel to a subscriber device (e.g., electronic device 119) for the channel. As shown, the electronic device 115 may also provide the channel identifier to the electronic device 119. For example, the electronic device 115 may provide the channel identifier and the key to the subscriber device (e.g., the electronic device 119) in a subscription invitation message (e.g., an out-of-band message that does not pass through the server 120). In one or more implementations, the electronic device 115 may generate the key and provide the key and a channel identifier for the channel (e.g., encrypted) to the invited subscriber device prior to encrypting data for publication using the key, and prior to providing the encrypted data to the publication server. The key may be a symmetric key or may be a public key of an asymmetric key pair for which the electronic device 115 stores the private key for encryption of data for publication. In some examples, the key may be a symmetric key that is a ratcheted key that only allows decryption of encrypted data that was encrypted after the generation of the symmetric key. For example, a ratcheted key may be a key that is derived (e.g., periodically or responsive to an event such as a new subscriber) based on the current key (e.g., at each of the participant devices). In one or more implementations, the subscriber devices and the publisher device can each derive the next ratcheted key from the current key (and/or a sequence number), but the prior keys cannot be derived from the current key or the next ratcheted key. In this way, existing subscribers can decrypt prior messages, and a newly invited subscriber device can decrypt new messages, but may be prevented from decrypting messages that were previously published to a channel before the new device was invited to subscribe (in some implementations).

FIG. 3 also indicates that the electronic device 115 may also provide the channel ownership token (e.g., and the key and the channel ID) to one or more other devices (e.g., electronic device 117) that are associated with (e.g., registered to and/or logged into) the same account as the electronic device 115. In this way, any device associated with the same account (e.g., multiple devices of the same user) can be provided with the information (e.g., the channel ownership token) for publishing to the channel.

In one or more implementations, the electronic device 119 can also provide the channel identifier and/or the key to one or more other devices associated with the same account as the electronic device 119. In this way, subscriptions for the user of the electronic device 119 can be synchronized across multiple devices of that user (e.g., without the server 120 having knowledge of the multiple devices of that user).

Figure 4:
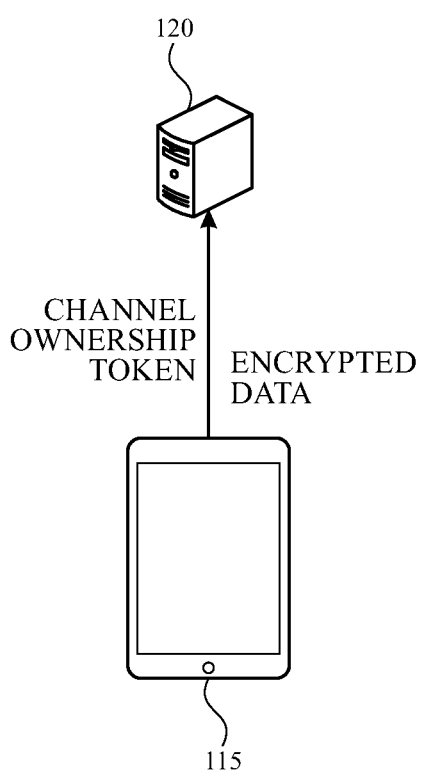
FIG. 4 illustrates an example exchange of information for publishing to a publication channel in accordance with one or more implementations.

FIG. 4 illustrates an example in which the electronic device 115 publishes to the channel established in the example of FIG. 2. In the example of FIG. 4, the electronic device 115 provides encrypted data (e.g., publication data encrypted at the electronic device 115 using the key that has been or is to be provided to the subscriber device as in the example of FIG. 3) to the server 120 for publication of the encrypted data, over the publication channel, to the subscriber device for the channel.

As shown, the electronic device 115 may provide the channel ownership token to the server 120 along with the encrypted data for publication. It is appreciated that the server 120 may not store information about the ownership of various channels. Instead, the ownership of a channel is verified using the channel ownership token that is provided to the server 120 by the publishing device, each time the publishing device attempts to publish to that channel. For example, when a publisher device publishes data to a channel using the channel ownership token, the server may verify the ownership of the channel using the channel ownership token provided at that time, but may not store or otherwise log the channel ownership anywhere that can expose the association of the channel identifier to the account corresponding to the channel ownership token or to any device associated with the account.

In one or more implementations, a publication request from the electronic device 115 to the server 120 may also include an account token (e.g., obtained by the electronic device 115 when the electronic device 115 was logged into an account, such as a user account) along with the channel ownership token. In one or more implementations, the server 120 may (e.g., communicate with another server such as the server 130 to) verify the account using the account token, obtain a user identifier for the account. The server 120 may verify the channel ownership token using the attributes of the channel ownership token (e.g., by verifying a version number, a number of components, and/or a format of the data in the token). Following successful verification, the server 120 may determine that the user identifier in the channel ownership token is the same as the user identifier obtained for the account using the account token (e.g., to verify that the user is the owner of the channel), and then send any accompanying encrypted publication data to subscriber devices for that channel.

In one or more implementations, the electronic device 115 may use multiple keys to provide an encrypted and/or sign payload with a request to publish to the publication server. For example, the electronic device 115 may use a first key that has been provided to subscriber devices to encrypt the data for publication, and may use one or more other keys (e.g., a second key) to encrypt and/or sign the channel ownership token, channel identifier, and/or any other information that is provided to the server 120 with the encrypted data for publication. In this way, the server can decrypt and/or verify the channel identifier and/or the channel ownership token without being able to decrypt the encrypted data for publication.

Figure 5:
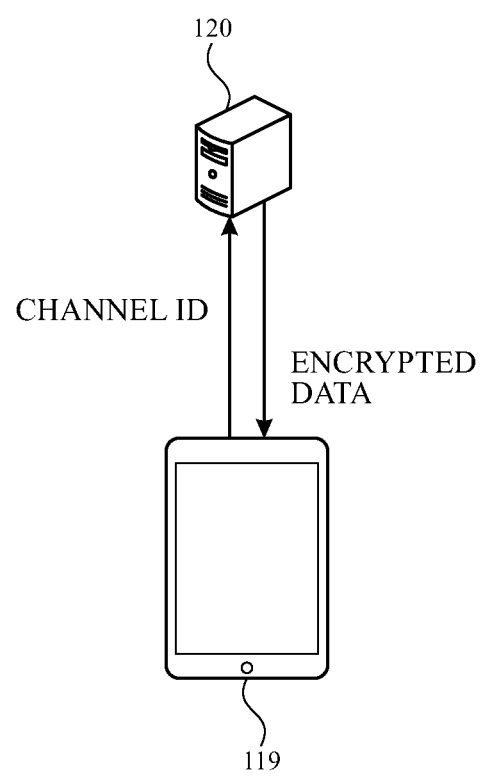
FIG. 5 illustrates an example exchange of information for receiving publications via a publication channel in accordance with one or more implementations.

FIG. 5 illustrates an example in which a subscriber device subscribes to a publication channel. In the example of FIG. 5, in order, for example to subscribe to a publication channel and receive encrypted data published by the electronic device 115 as in the example of FIG. 4, the electronic device 119 may provide the channel identifier received from the electronic device 115 to the server 120. As shown, the subscriber device may then receive (e.g., via a push notification or other communications channel established between the electronic device 119 and the server 120) the encrypted data that was published by the electronic device 115 using the channel ownership token (e.g., as described in the example of FIG. 4). Because the electronic device 119 also received the key from the electronic device 115 (e.g., as described in the example of FIG. 4), the electronic device 119 is able to decrypt the encrypted data published by the electronic device 115. It is appreciated that, the electronic device 119 may subsequently disconnect from the server 120, and the server 120 may not store any information associated with the electronic device 119 or any data that was provided to the electronic device 119 after the disconnection.

In one or more implementations, the electronic device 119 may also provide index information or checkpoint information (e.g., a sequence number or a timestamp) to the server 120 with the channel identifier. For example, the index information may indicate the last published data (e.g., a last message) or a time corresponding to the last published data received for the publication channel (e.g., in cases in which the electronic device 119 is reconnecting to the server 120 after having previously been subscribed to the channel). The server 120 may identify any published data received for that channel since the time or index corresponding to the index information, and provide the identified published data to the electronic device 119. In this way, the electronic device 119 can receive any updates or messages that may have been missed while the electronic device 119 was not connected to the server 120 (e.g., even though the server 120 does not store information about the electronic device 119 or the status of messages or publications provided to the electronic device 119).

The examples of FIGS. 2-5 illustrate how a publisher device can publish data to a subscriber device, via a publication server, without exposing the published data to the publication server, and without the publication server being able to identify a user's (e.g., subscriber's) interests, being able to track the reach or distribution of the published data, and/or having to store and/or track subscribers and/or the status of the subscribers and/or which data has been delivered to the subscribers. This can be advantageous both in protecting the privacy of publishers and subscribers, and in improving the computing, storage, and communications efficiency for the server and the client devices.

The examples of FIGS. 2-5 describe the establishment of publication channels between publisher devices and subscriber devices. In various examples the publisher devices and the subscriber devices can be client devices, such as smartphones, tablets, laptops, or the like. In some examples, the publication channels described herein can also be used by publication servers for publishing data to subscriber devices. In various implementations, the publication channels can be used by a publisher device or publisher server to publish any suitable data. This can include data that is commonly published by other systems without the privacy preserving and/or efficiency features described herein, such as news alerts, blog posts, or the like. However, the privacy preserving features of the publication channels described herein can also facilitate the sharing of other data between users.

For example, in one or more implementations, the encrypted data that is published by the electronic device 115 in the example of FIG. 4, and obtained by the electronic device 119 in the example of FIG. 5, may include encrypted status information for a user of the electronic device 115. In this way, the user of the electronic device 115 can securely allow a trusted user of the electronic device 119 to obtain status information for the user of the electronic device 115 (e.g., status information indicating whether the user of the electronic device 115 is busy, available, at a particular location, or engaged in a particular activity), without the user of the electronic device 115 having to actively update and/or send the status information and/or without the user of the electronic device 119 having actively seek out or request the status information each time the status information is desired.

Figure 6:
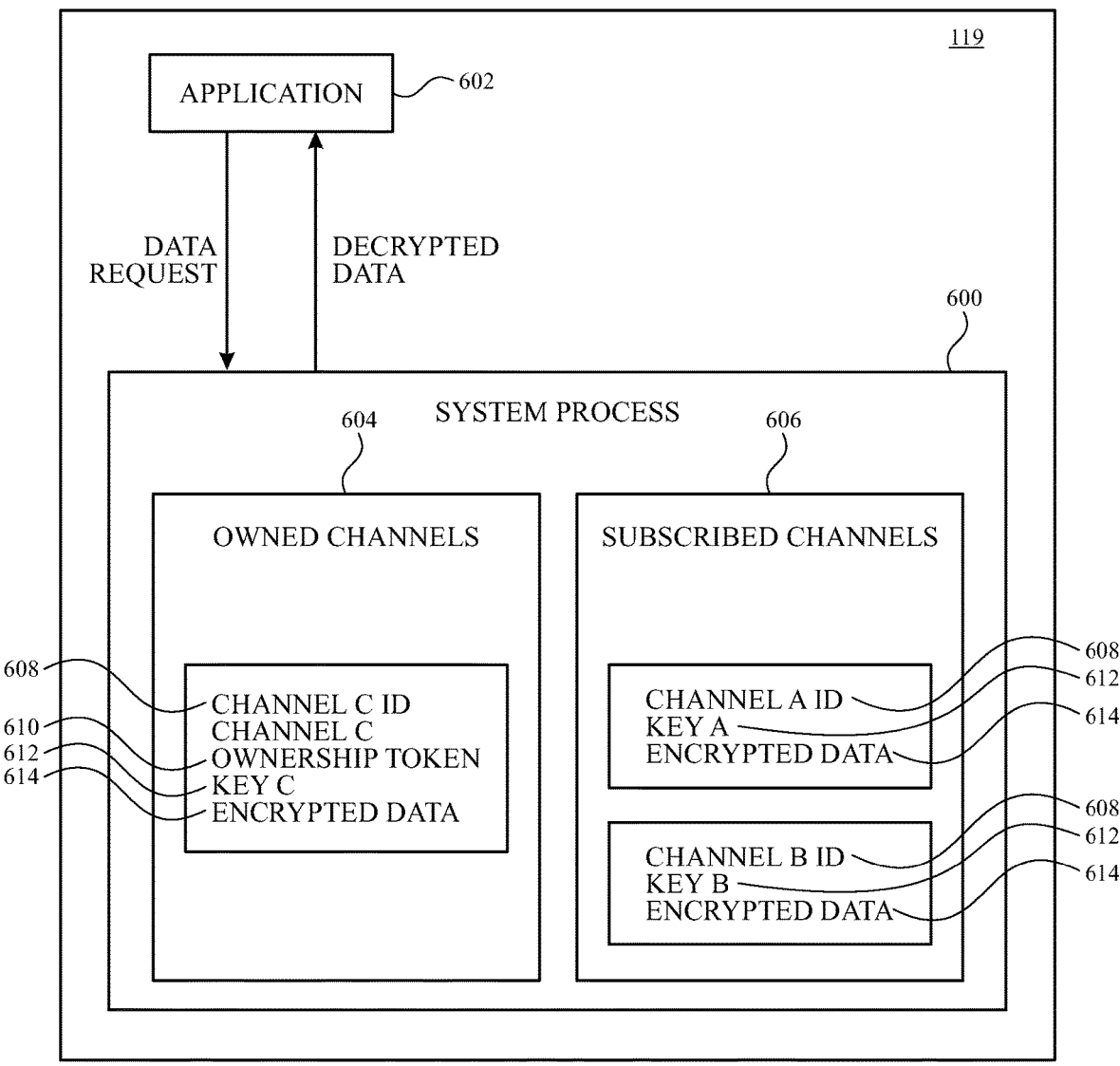
FIG. 6 illustrates a schematic diagram of a system process for managing publications and subscriptions for an electronic device in accordance with one or more implementations.

In one or more implementations, the electronic device 115 and the electronic device 119 may include one or more system processes that further protect the privacy of any user status information that may be exchanged using a publication channel as described herein. For example FIG. 6 illustrates an implementation in which the electronic device 119 includes a system process 600 and an application 602. In this example, the system process 600 may manage publications and subscriptions for the electronic device 119, including on behalf of the application 602 and/or other applications at the electronic device 119.

As shown, a system process such as system process 600 at an electronic device such as electronic device 119 may store owned-channel data 604 for one or more channels that are owned by that device (and/or another device associated with the same account as that device) and/or subscribed-channel data 606 for one or more publication channels to which the electronic device is subscribed. In the example of FIG. 6, the owned-channel data 604 includes a channel identifier 608 (e.g., "Channel C ID"), a channel ownership token 610 (e.g., "Channel C Ownership Token") corresponding to the channel identifier 608, one or more keys such as key 612 (e.g., "Key C") corresponding to the channel identifier 608, and/or encrypted data 614 that has been published and/or is to be published to the channel corresponding to the channel identifier 608 (e.g., by providing the encrypted data 614 to a server such as server 120, as described above in connection with FIG. 4).

In the example of FIG. 6, the subscribed-channel data 606 includes, for each of two publication channels (e.g., channels "A" and "B") to which the electronic device 119 is subscribed: a channel identifier 608 (e.g., "Channel A ID" and "Channel B ID"), one or more respective keys such as a respective key 612 (e.g., "Key A" and "Key B") corresponding to the respective channel identifier 608, and/or respective encrypted data 614 that has been obtained (e.g., from the server 120) using the respective channel identifier 608 (e.g., by providing the channel identifiers 608 to a server such as server 120 as described above in connection with FIG. 5).

In one or more implementations, the application 602 may provide a data request (e.g., for data from one of the subscribed channels) to the system process 600, and the system process 600 may decrypt the encrypted data obtained for a corresponding channel, and provide the decrypted data to the application 602. In this way, the system process 600 can control the access to subscribed information, and can allow and/or prevent applications such as application 602 access to encrypted data (e.g., based on permissions for the application).

As shown in FIG. 6, in one or more implementations, the system process 600 at the electronic device 119 (e.g., a first device of a first user) receives data request from the application 602. In one or more implementations, the data request may be a request for a status of a second user of a second device (e.g., electronic device 115). In one or more implementations, the application 602 may be a messaging application that requests the status from the system process 600 when the first user initiates a messaging session with the second user with the messaging application. In one or more implementations, the application 602 may be a contacts application that requests the status from the system process 600 when the user opens a contact card or a contacts list including a contact for the user of the second device. In one or more implementations, the application 602 may be a photos application that requests the status from the system process 600 when a photo of the user of the second device is viewed at the first device.

The system process 600 may obtain encrypted status information corresponding to the status of the second user from the second device. For example, the system process 600 may obtain the encrypted status information by subscribing to a publication channel, such as the publication channel with the Channel A ID, on which the electronic device 115 publishes status information for the user of that device and obtaining the encrypted published data via the subscribed channel. In one or more other implementations, the system process 600 may have previously subscribed to the channel, and may have the encrypted status information stored locally at the electronic device 119 to be obtained from the local storage responsive to the request from the application.

The system process 600 may then decrypt the encrypted status information using a key (e.g., Key A) provided by the electronic device 115 (e.g., as described above in connection with FIG. 3). For example, prior to obtaining the encrypted status information, the system process 600 at the electronic device 119 may receive and store the key. In some examples, the key is a ratcheted key that only allows decryption of encrypted status information received from the electronic device 115 after the electronic device 119 receives the key (or after that particular key was generated at the electronic device 115). Prior to obtaining the encrypted status information, the system process 600 at the electronic device 119 may also receive and store a channel identifier (e.g., "Channel A ID") from the electronic device 115, the channel identifier identifying a status publication channel of the electronic device 115. The system process 600 may obtain the encrypted status information from a publication server (e.g., server 120) over the status publication channel of the electronic device 115, by providing a request, including the channel identifier, to the publication server (e.g., as described above in connection with FIG. 5).

The system process 600 may then provide the status of the second user to the application 602. In one or more implementations, the application 602 displays the status received from the system process 600. For example, the application may include the status information in a user interface such as a widget corresponding to the application, a contact card of the user of the second device, or other user display information (as examples). The status information obtained from the electronic device 115 may include the status itself, or may include information for determining the status at the electronic device 119.

In one or more implementations, the status information may include multiple status identifiers (e.g., an availability status indicator that indicates whether the user of electronic device 115 is busy or available, a location status indicator that indicates a location of the user of the electronic device 115, a calendar status indicator indicating a calendar event in a calendar of the user of the electronic device 115, and/or an activity status indicator that indicates whether the user of the electronic device 115 is engaged in a particular activity such as reading, working, sleeping, working out, etc.). The system process 600 may determine the status of the user of the electronic device 115 using the multiple status identifiers prior to providing the status to the application 602 in some implementations.

As indicated by the owned-channel data 604 of FIG. 6, the system process 600 may also publish a status of the user of the electronic device 119 to an invited subscriber device (e.g., the electronic device 110) of another user. For example, the system process 600 may publish the status of the user of the electronic device 119 by providing an encrypted version of the status (e.g., the encrypted data 614 corresponding to the "Channel C ID") of the user to a publication server (e.g., server 120) with a channel token (e.g., "Channel C Ownership Token") corresponding to a publication channel of the user and/or the electronic device 119. In one or more implementations, prior to providing the encrypted version of the status of the user and the channel token to the publication server, the system process 600 provides a key (e.g., "Key C") and a channel identifier (e.g., "Channel C ID") of the publication channel of the user to the invited subscriber device (e.g., using the operations described above in connection with FIG. 3, but with the electronic device 119 as the publisher device).

Prior to providing the key and the channel identifier of the publication to the invited subscriber device, the system process 600 may establish the publication channel with the publication server, such as by authenticating an account of the first user, and obtaining the channel token (e.g., "Channel C Ownership Token") and the channel identifier (e.g., "Channel C ID") of the publication channel of the first user from the publication server (e.g., using the operations described above in connection with electronic device 115 in FIG. 2). In one or more implementations, authenticating the user account may be achieved by providing the publication server with an account token received upon sign-in of the electronic device 119 to the user account. In one or more implementations, the electronic device 119 provides the channel identifier (e.g., "Channel C ID"), the key (e.g., "Key C"), and the channel token (e.g., "Channel C Ownership Token") to at least one additional device of the user of the electronic device 119 that is signed into the account of that user (e.g., using the operations described above in connection with electronic device 115 and electronic device 117 in FIG. 3). In one or more implementations, a subscriber device may be uninvited from a publication channel, such as by rolling the key for the publication channel at the publisher device, and providing the new key to the still-invited subscriber device.

In one or more implementations, the electronic device 117 of FIG. 6 can temporarily or permanently unsubscribe from a subscribed channel by disconnecting from the publication server (e.g., server 120) and/or by deleting the channel identifier 608 of that channel from the subscribed-channel data 606 that is stored by the system process 600 and that is provided to the publication server. In this way, the system process 600, and the publication channel features described herein, can allow a user of a subscriber device to maintain a transient or persistent subscription to a publication channel by controlling local information stored at and/or transmitted from the local device (e.g., without having to modify account information with a server that manages subscriptions).

The examples of FIGS. 2-6 illustrate various operations that can be performed by client devices and/or publication servers for publishing data from a single publisher device to a single subscriber device. FIGS. 7-11 illustrate various aspects of server operations that may be performed for providing publication and subscription services for various publisher devices and/or servers and/or various subscriber devices.

Figure 7:
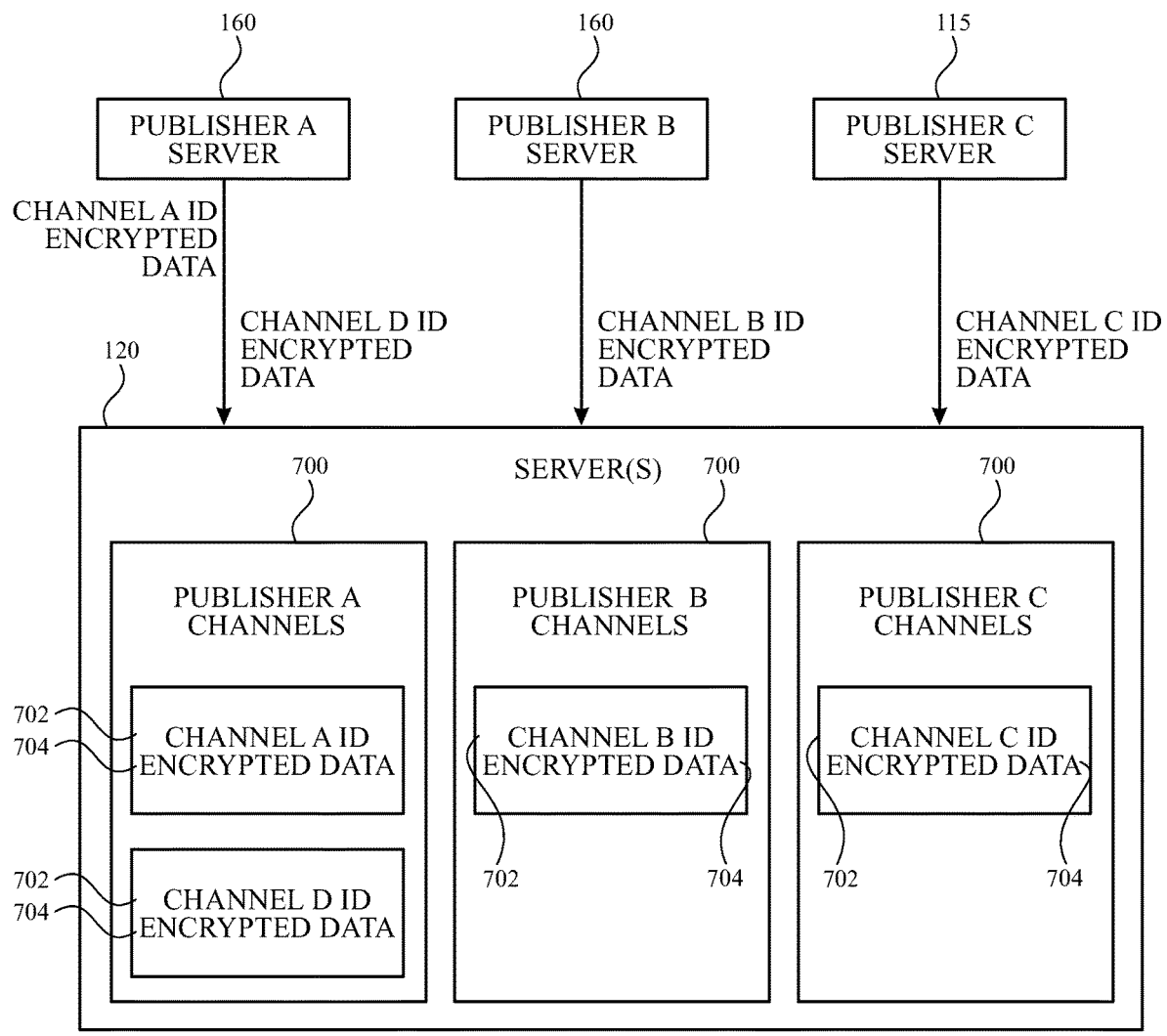
FIG. 7 illustrates a schematic diagram of a server in accordance with one or more implementations.

For example, FIG. 7 illustrates how a publication server, such as server 120, may receive publication data from various publisher servers and/or publisher devices. In the example of FIG. 7, the server 120 receives encrypted publication data from two publisher servers 160 (e.g., a publisher A server and a publisher B server) and from a publisher device (e.g., a publisher C device, such as electronic device 115, the electronic device 117, or the electronic device 119). For example, the publisher A server may be a publisher server 160 of a publisher of a cable news organization, and the publisher B server may be a publisher server 160 of a publisher of a print publication (e.g., a newspaper or a magazine). As shown, the publication data from each publisher may be provided to a publication server (e.g., server 120) with a channel identifier for that publication data. In the example of FIG. 7, the publisher B server and the publisher C device each provide encrypted data for a single corresponding publication channel (e.g., identified by a single respective channel identifier "Channel B ID" and "Channel C ID"). In this example, the publisher A server provides encrypted data for two publication channels identified, respectively, by a "Channel A ID" and a "Channel D ID". For example, the two publication channels identified, respectively, by the "Channel A ID" and a "Channel D ID" may correspond to two topics or categories for which the publisher A server publishes notifications. As examples, if the publisher A is a news organization, the two topics or categories may include any two of politics, sports, fashion, medicine, local news, music, arts, world, subscriber-device type, subscriber-device operating system, or the like. In the example of FIG. 7, the publication data that is provided from the publisher servers 160 and the publisher device 115 to the server(s) 120 is shown as being encrypted. It is also appreciated that, in some use cases, a publisher server 160 may provide some or all of its publication data to the server(s) 120 in an unencrypted form. For example, in a use case in which the publisher A server is a server of a news organization, the news organization may desire that some or all of the publication data that is provided to the server(s) 120 for news stories be available to subscriber devices that may not have a key for decrypting the publication data. For example, in some use cases, a publisher server 160 may provide unencrypted data over some publication channels (e.g., the publication channel corresponding to the Channel A ID) to be available to any subscriber device having the channel identifier(s) for those channels, and encrypted data over other publication channels (e.g., the publication channel corresponding to the Channel B ID) to be available only to subscriber devices that have received a key for those publication channels. In other use cases, a publisher server 160 may encrypt all publication data that is provided to the server(s) 120 (e.g., and may provide keys and channel IDs to subscriber devices for obtaining and decrypting the encrypted data).

As illustrated in FIG. 7, a publication server such as the server 120 may store publisher data 700 from the multiple publishers. The publisher data may be stored in encrypted form in connection with the corresponding channel identifier, for delivery to any subscriber devices that connect to the publication server and that are subscribed to the channel identified by that channel identifier. For example, FIG. 8 illustrates a subscriber device that is connected to the server 120 storing publisher data 700 received from the publisher servers 160 and publisher device 115 as in the example of FIG. 7.

Figure 8:
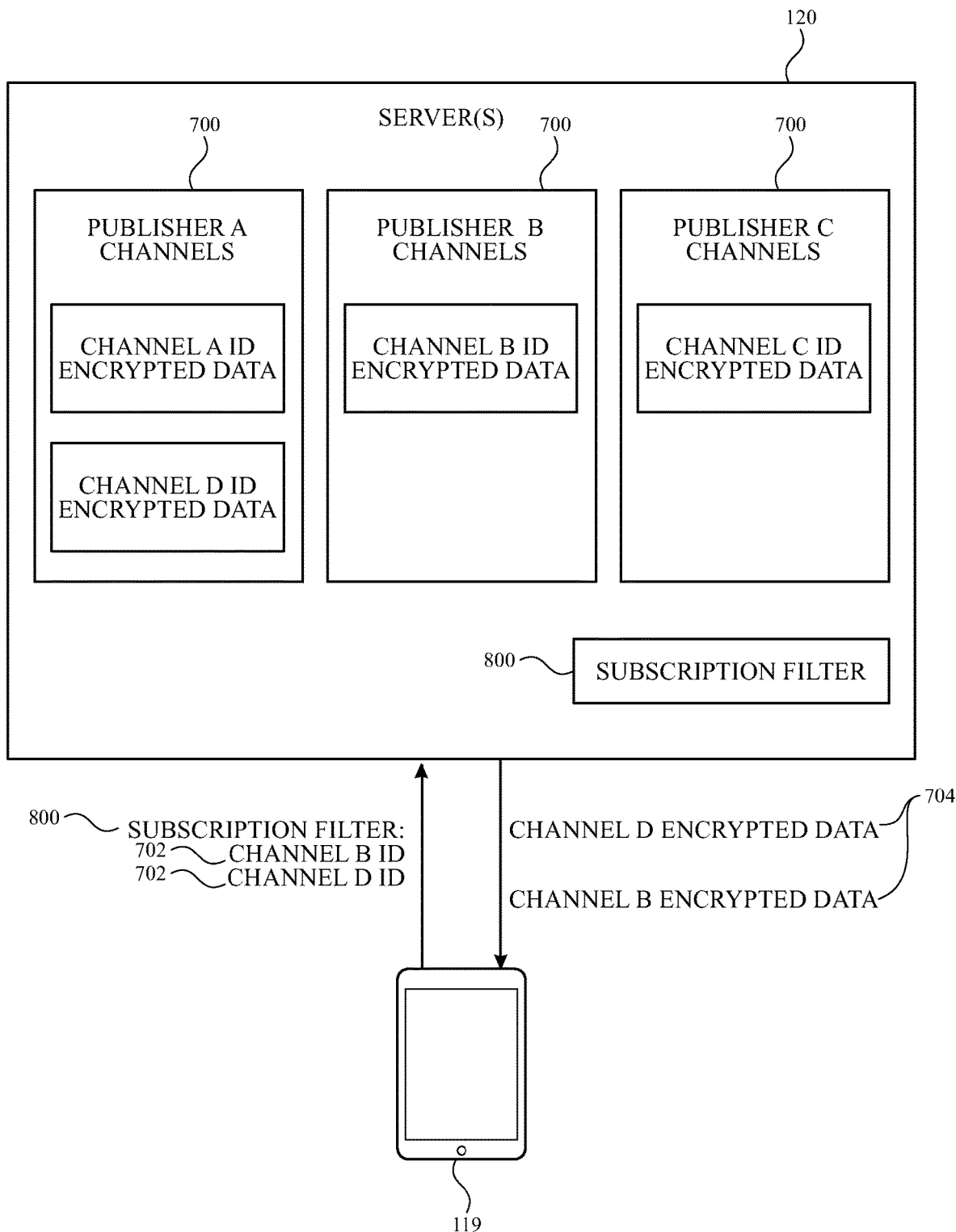
FIG. 8 illustrates a schematic diagram of an example exchange of information for receiving publications via a publication channel from a server in accordance with one or more implementations.

In the example of FIG. 8, a server system (e.g., a server system including the server 120, the server 130, and/or the server 150) may receive a subscription filter 800 from electronic device 119 (e.g., also referred to herein as a client device or subscriber device) upon establishing a connection with the client device. For example, a system process such as system process 600 of FIG. 6 may provide the subscription filter 800 to the server 120 upon establishing the connection with the server 120. As indicated in FIG. 8, while the electronic device 119 is connected to the server 120, the server 120 may store the subscription filter 800 received from the electronic device 119. In this example, the subscription filter 800 includes a list of two channel identifiers 702 (e.g., Channel B ID and Channel D ID). The server system (e.g., server 120) may then identify a set of notifications (e.g., the Channel D encrypted data and the channel D encrypted data) using (e.g., based on) the subscription filter 800 (e.g., based on the channel B ID and the channel D ID in the subscription filter). As shown in FIG. 8, the server system may then provide the set of notifications (e.g., the encrypted data 704 for each of the channels identified in the subscription filter) to the electronic device 119.

Figure 9:
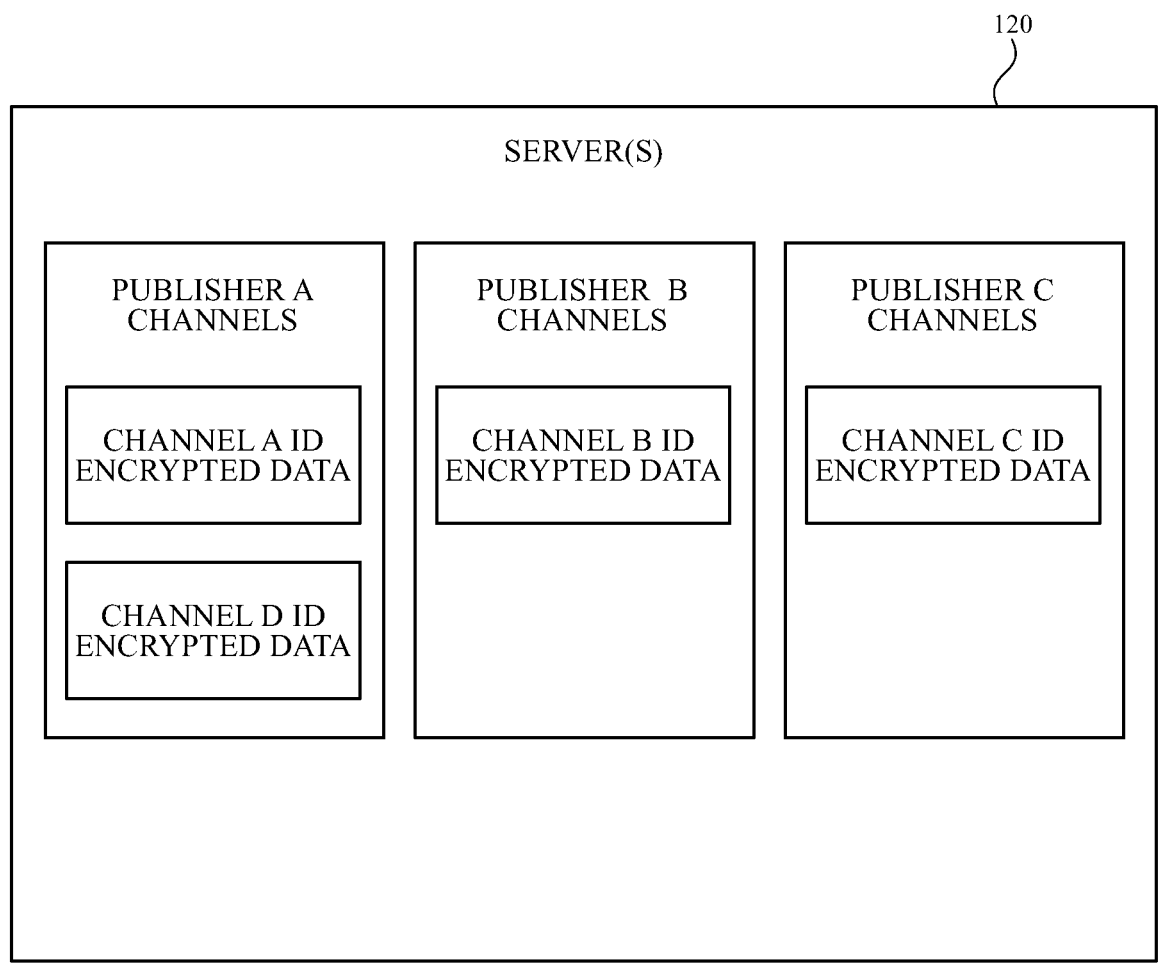
FIG. 9 illustrates a schematic diagram of a server following disconnection of a subscriber device in accordance with one or more implementations.
Figure 9:
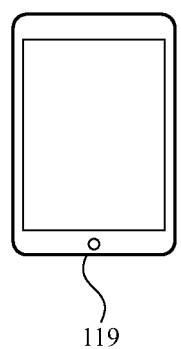

As noted above in connection with FIG. 8, while the electronic device 119 is connected to the server 120, the server 120 may store the subscription filter 800. As shown in FIG. 9, the server system (e.g., server 120) may delete the subscription filter 800 upon termination of the connection to the client device. In this way, a server system can be provided that can distribute publications from various channels from various publishers to various subscriber devices, without persistently storing subscription information for the subscriber devices. In one or more implementations, a subscriber device, such as electronic device 119, may connect to the server 120 over multiple interfaces (e.g., via a cellular interface and via or Wi-Fi interface). In these implementations, the server 120 may select one of the interfaces for the electronic device 119 (e.g., the Wi-Fi interface) as a primary interface, and may provide the encrypted data to the electronic device 119 only over the primary interface.

In the example of FIGS. 7 and 8, the server 120 receives notifications from various publishers, and the subscription filter 800 identifies one or more channels corresponding to one or more of the publishers. In the example of FIGS. 7 and 8, while the connection to the electronic device 119 remains active during a time between the establishment of the connection and the termination of the connection, the server 120 provides notifications, messages, and/or other data received from publisher channels identified in the subscription filter 800 to the electronic device 119 as the notifications are received by the server system from the publishers.

Figure 10:
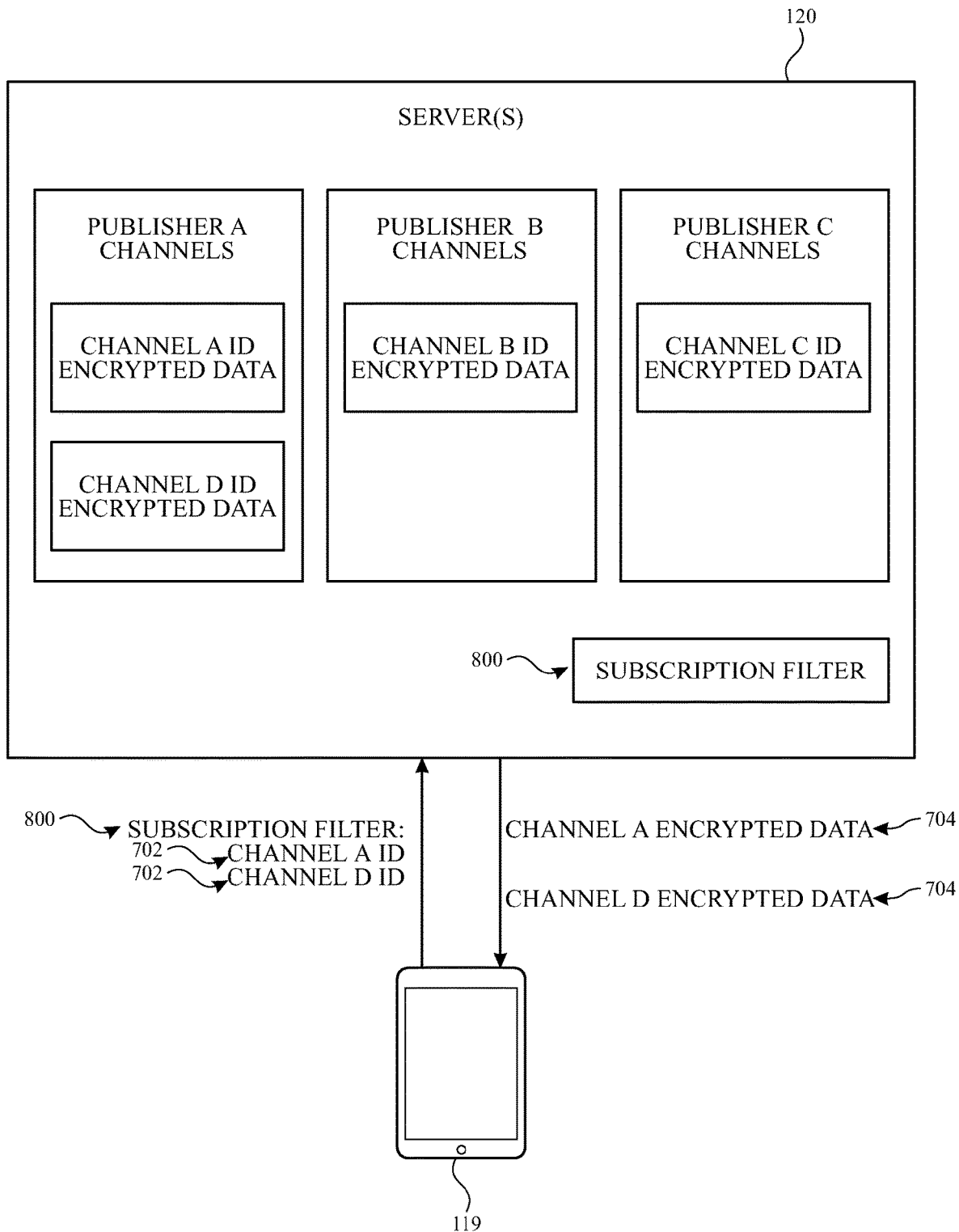
FIG. 10 illustrates an example exchange of information for receiving publications via modified publication channels from a server in accordance with one or more implementations.

Aspects of the subject technology also facilitate user updates and/or changes to subscriptions. For example, as illustrated in FIG. 10, while the connection to the electronic device 119 is active, the server 120 may receive an update to the subscription filter 800 from the electronic device 119. In the example of FIGS. 8 and 10, the subscription filter 800 (including Channel B ID and Channel D ID) that was provided to the server 120 when the electronic device 119 connected to the server 120, has been updated to include Channel A ID and Channel D ID. In this way, the electronic device 119 has unsubscribed from the publication channel corresponding to the Channel B ID from the publisher B, and subscribed to both the publication channels corresponding to the Channel A ID and the Channel D ID from the publisher A. In the example of FIG. 10, the electronic device 119 updates its subscriptions by sending the updated subscription filter 800 including the entire current subscription list for the electronic device 119, which the server(s) 120 use to replace the prior version of the subscription list in its entirety. However, it is appreciated that, in one or more implementations, the electronic device 119 may update its subscriptions by sending only changes to a previously provided subscription filter 800 (e.g., by sending, while the electronic device 119 maintains a continuous connection to the server(s) 120 after sending a subscription filter 800, the channel A ID for addition to the subscription list and an instruction to remove the channel B subscription) to the server(s) 120. In one or more implementations, the electronic device 119 may also be the publisher device of the publication channel corresponding to Channel C ID.

As shown in FIG. 10, following the update to the subscription filter 800, the server 120 may provide notifications (e.g., channel A encrypted data and channel D encrypted data) from an updated set of the publishers (e.g., publisher A only) according to the updated subscription filter. In some examples, the update to the subscription filter is due to a user input provided to the electronic device. As illustrated in the example of FIG. 10, the update can include a change in the publishers to which the electronic device 119 subscribes, and/or a change to the categories, topics, or other intra-publisher channels of a single publisher. In one or more implementations, the server 120 may also determine a device type or an operating system of the electronic device 119 (e.g., based on connection information such as information included in network data packets received from the electronic device 119 as part of the connection and/or communication operations with the server 120).

In one or more implementations, a publisher may publish data to one or more device-specific and/or operating-system-specific channels, such as notifications that may be of interest to users of smartphones, users of laptop computers, users of devices from a particular manufacturer, or user of devices running a particular operating system (e.g., a news story or a blog post about an upcoming update release for the operating system or a known security issue with the operating system). In one or more implementations, the server 120 may provide data corresponding to one or more device-specific and/or operating-system-specific channels (which may be, or may be subsets of, a channel to which the a subscriber devices is subscribed) to subscriber devices based on the determined device type and/or operating system type (e.g., as determined using the subscription filter or other connection information received from the subscriber devices). In one example, the server 120 may detect a device type of the electronic device 119 upon establishment of the connection to the electronic device 119. A publisher of a notifications may identify, to the server 120, some or all of the notifications as notifications for client devices of the device type, and the server 120 may provide the notifications to connected and subscribed electronic devices after determining the device type.

In various examples described herein, encrypted data is provided to a publication server, such as server 120, from a publisher device or publisher server, and distributed to subscriber device while the subscriber devices are connected to the publication server. It is also appreciated that the description herein of the publication server operations as being performed by single server is merely illustrative, and that the server operations described herein can be performed by one or more servers, such as a system of servers (e.g., server system). In one or more implementations, a system of servers may include one or more central or primary servers and/or one or more servers (e.g., edge servers) distributed in geographical regions that are nearer to the publisher and/or subscriber devices in those geographical regions.

Figure 11:
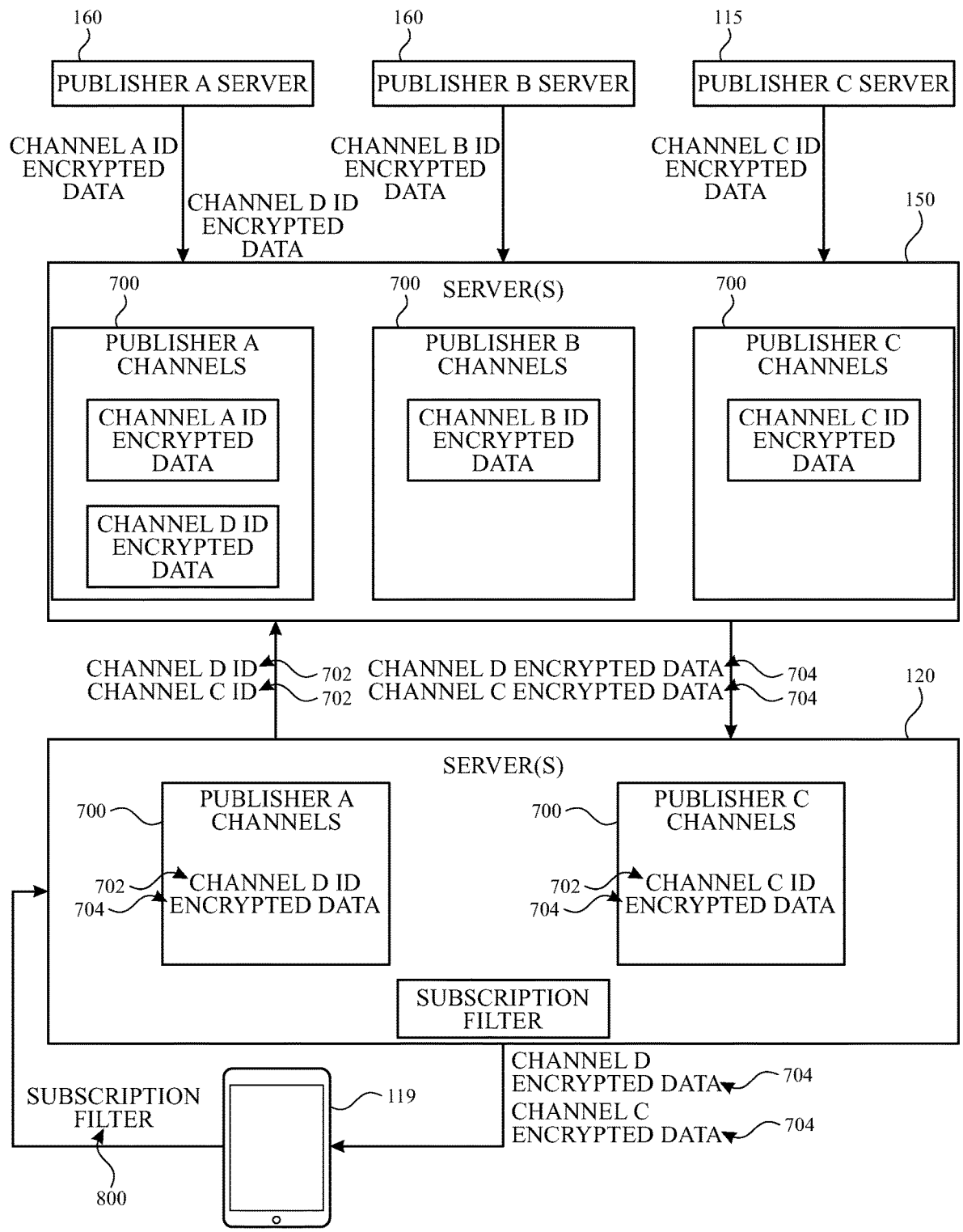
FIG. 11 illustrates an example exchange of information for receiving publications via a primary server and an edge server in accordance with one or more implementations.

For example, FIG. 11 illustrates an implementation in which a server system includes a primary server 150 and an edge server (e.g., server 120 implemented as an edge server). As shown in FIG. 11, the primary server 150 may receive notifications and/or other publisher data from various publishers. In the example of FIG. 11, the primary server 150 receives encrypted publication data from two publisher servers 160 (e.g., a publisher A server and a publisher B server) and from a publisher device (e.g., a publisher C device, such as electronic device 115, the electronic device 117, or the electronic device 119). As shown, the encrypted data from each publisher may be provided to the primary server 150 with a channel identifier for that encrypted data. In the example of FIG. 11, the publisher B server and the publisher C device each provide encrypted data for a single corresponding publication channel (e.g., identified by a single respective channel identifier "Channel B ID" and "Channel C ID"). In this example, the publisher A server provides encrypted data for two publication channels identified, respectively, by a "Channel A ID" and a "Channel D ID".

As shown in FIG. 11, the primary server 150 may send a subset of the notifications received from the publishers, to the server 120. The subset may be based on one or more subscription filters received from connected subscriber devices, such as the subscription filter 800 received by the server 120 from the electronic device 119 that is connected to the server 120. In this example, the server 120 obtains the list of channel identifiers (e.g., Channel C ID and Channel D ID) from the subscription filter 800 (e.g., and/or any other subscription filters received from any other subscriber devices connected to the server 120), and provides the channel identifiers to the primary server 150. Based on the channel identifiers received from the server 120, the primary server 150 provides corresponding encrypted data (e.g., notifications encrypted as channel D encrypted data and channel C encrypted data) to the server 120, and the server 120 provides the corresponding encrypted data to the connected electronic device 119.

In one or more implementations, the subscription filters 800 received from subscriber devices at the server 120 may be provided to the primary server 150. In one or more other implementations, rather than providing the subscription filters 800 to the primary server 150, the server 120 may only provide each unique channel identifier from the subscription filters to the primary server 150 once. In these implementations, the primary server 150 sends a particular notification to the server 120 if at least one client device connected to the server 120 is subscribed to a channel corresponding to that notification. In this way, information indicating how may devices connected to the server 120 are subscribed to any particular channel is not passed up from the server 120 to the primary server 150, and the primary server 150 only has an indication that at least one subscriber device for a channel is connected to the server 120. Moreover, the server 120 operating as an edge server as in the example of FIG. 11 may not receive any subscription information regarding subscriber devices connected to other edge servers, and thus may also be prevented from obtaining information indicating how many subscriber devices are subscribed to any particular channel or how many channels are available or being subscribed to. Thus, aspects of the subject technology can help protect the privacy of publishers and subscribers, and can also reduce the computational burden on primary and/or edge servers in a server system for publication and subscription. It is appreciated that, while a single server 120 and a single primary server 150 are shown in FIG. 11, in various implementations, server 120 may be one server of many edge servers connected to the primary server 150 and/or one or one more other primary servers. Aspects of the subject technology may also reduce the computational burden on publisher servers, since the server systems illustrated in FIGS. 6-11 allow publishers to send a single message/notification for distribution by the server system, instead of the publisher sending (e.g., potentially hundreds, thousand, millions, or billions) of individual messages/notifications to individual subscriber devices.

Aspects of the subject technology also facilitate a subscriber device receiving any missed notifications or other published data that have been published to subscribed channel while the subscriber device was not connected to a publication server (e.g., due to the subscriber device having been turned off, out of power, or without a network connection, for a period of time), without the publication server persistently storing subscriber status information for each subscriber device and/or for each notification.

Figure 12:
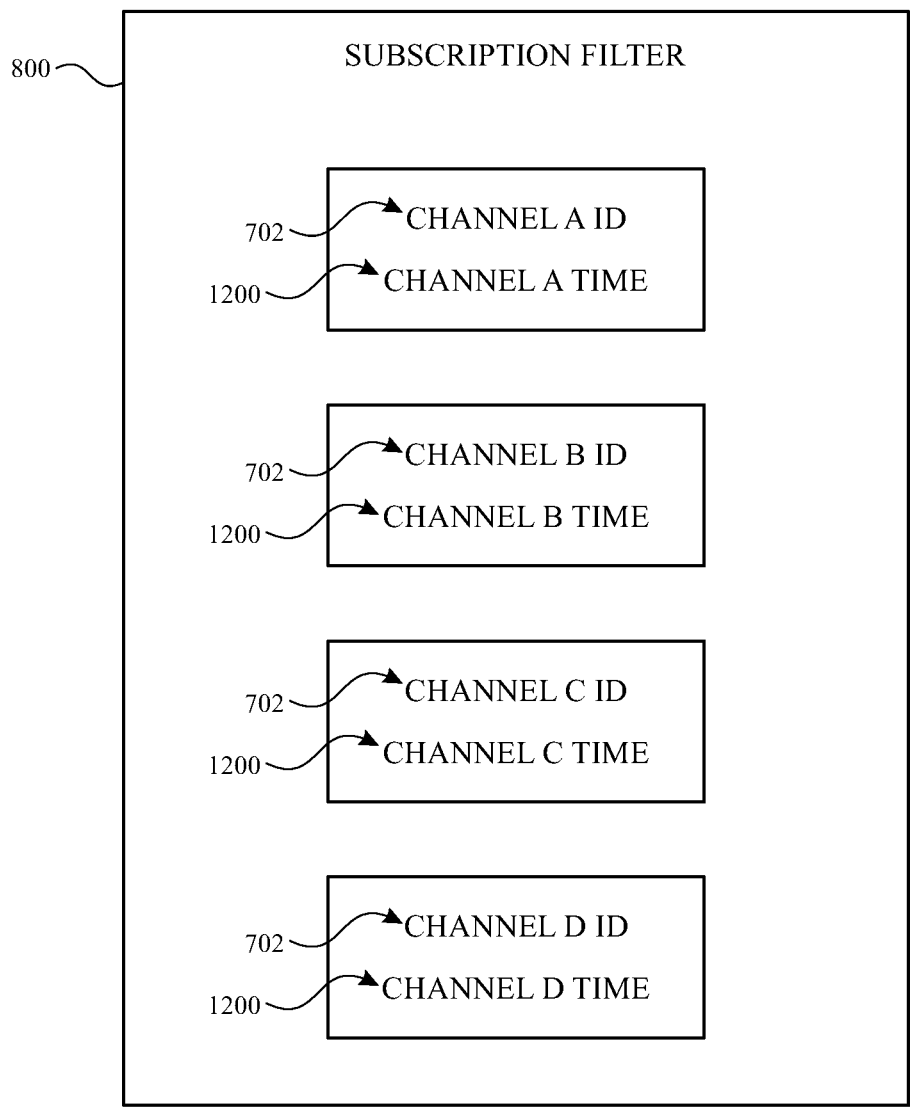
FIG. 12 illustrates an example subscription filter in accordance with one or more implementations.

For example, as shown in FIG. 12, a subscription filter 800 that is provided from a subscriber device to a publication server may include, in addition to the channel identifiers 702 for channels to which the subscriber device is subscribed, a time stamp 1200 (or other time and/or sequence information) for each of the one or more publication channels (e.g., for each of one or more publishers and/or each of one or more categories or topics of the notifications from each publisher). Referring again to FIG. 11, the set of notifications defined by the subscription filter 800 that is provided from the electronic device 119 to the server 120 (e.g., and from the server 120 to the primary server 150) may include notifications received at the server system for each of the one or more channels since a time corresponding to the time stamp 1200 for that category in the subscription filter.

In one exemplary operational scenario, the server 120 may establish a new connection to the electronic device 119 after the termination of a prior connection between the server 120 and the electronic device 119 (e.g., and after deleting the subscription filter 800 previously received from the electronic device 119 upon disconnection of prior connection to the electronic device 119). Upon establishing the new connection, the server 120 may receive a new version of the subscription filter 800 including a new time stamp 1200 corresponding to a time of a last notification provided to the electronic device 119 for each channel while the electronic device 119 was previously connected. The server 120 (e.g., in cooperation with the primary server 150 in some implementations, such as is described herein in connection with FIG. 11) may then provide notifications received at the server system (e.g., at the primary server 150) between the time of the new time stamp 1200 and a current time, to the electronic device 119. In some examples, the electronic device 119 device updates the time stamp 1200 for each channel after receiving the set of notifications and/or upon disconnection from the server 120. Aspects of the subject technology provide a server system for publications and subscriptions that is stateless. That is, the server system may not store subscription filters 800 for the client devices that are not currently connected to the server system, and may not store last message information (e.g., time stamps 1200), or any other information about the subscriptions or the states of the subscriptions for any individual device, user, or publication channel.

Figure 13:
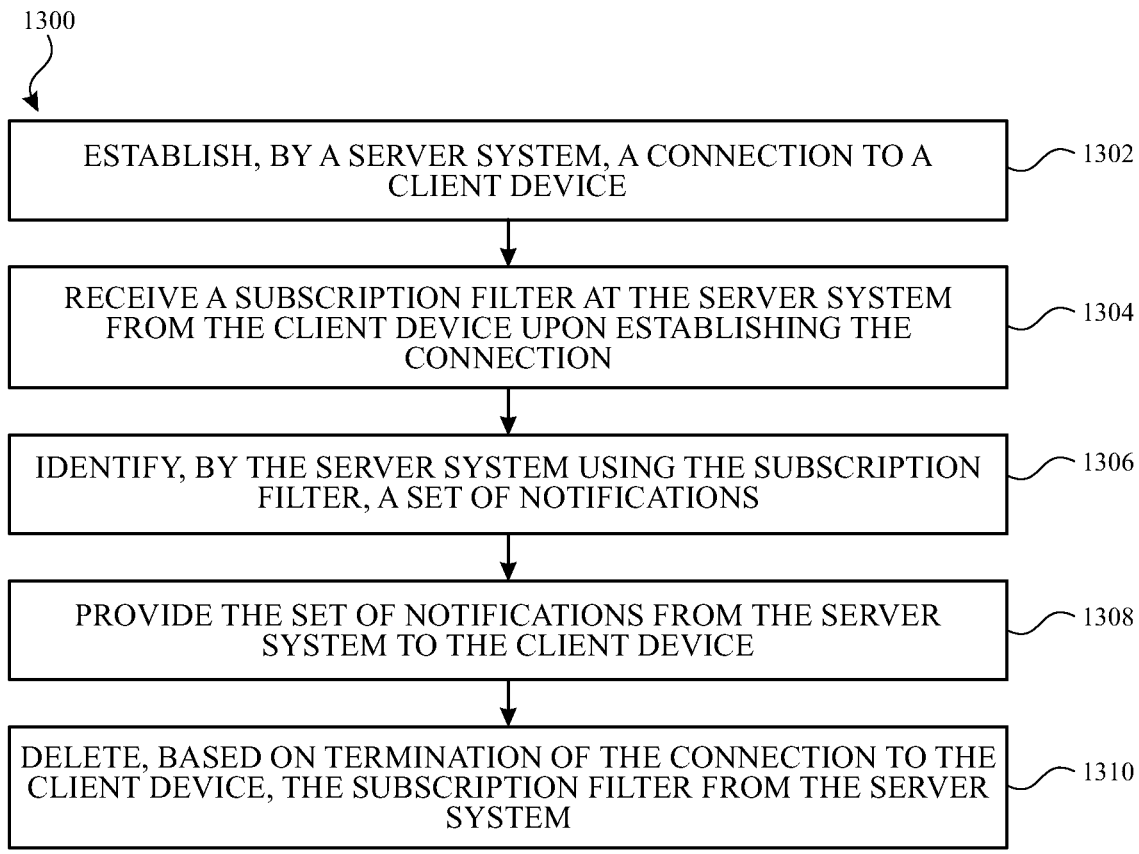
FIG. 13 illustrates a flow diagram of an example process for privacy-preserving publication and subscription operations by a server in accordance with one or more implementations.

FIG. 13 illustrates a flow diagram of an example process 1300 for providing a publication and subscription (e.g., pub-sub or PubSub) service, in accordance with one or more implementations. For explanatory purposes, the process 1300 is primarily described herein with reference to the components of FIG. 1 (particularly with reference to the electronic device 119 and the server 120 and the server 150), which may be executed by one or more processors of the server 120 and the server 150 of FIG. 1. However, the process 1300 is not limited to the electronic device 119, the server 120 and the server 150, and one or more blocks (or operations) of the process 1300 may be performed by one or more other components of other suitable devices, such as one or more of the electronic device 110, the electronic device 115, the electronic device 117, and/or one or more other servers such as the server 130. Further for explanatory purposes, the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

In the example process 1300, at block 1302, a server system (e.g., including server 120 and/or server 150) establishes a connection to a client device (e.g., electronic device 119). In one or more implementations, the server system may also receive a plurality of notifications from a plurality of publishers (e.g., as described herein in connection with FIG. 7 and/or FIG. 11). In various implementations, the notifications may include news alerts, application notifications, status information, and/or other notifications and/or messages as described herein.

At block 1304, the server system receives a subscription filter (e.g., a subscription filter 800 including one or more channel identifiers 702, time stamps 1200, and/or sub-channel filter information) from the client device upon establishing the connection (e.g., as described herein in connection with FIG. 8 and/or FIG. 11). In one or more implementations, the subscription filter is received from a system process (e.g., system process 600 of FIG. 6) that manages publications and subscriptions at the client device.

At block 1306, the server system may identify, using the subscription filter, a set of notifications. For example, the set of notifications may have been previously received in encrypted form from one or more publisher servers and/or publisher devices. In one or more implementations, the subscription filter identifies one or more channels corresponding to one or more of the plurality of publishers. Identifying the set of notifications may include identifying a subset of the plurality of notifications that have been received by the server system over the one or more channels.

At block 1308, the server system may provide the set of notifications to the client device (e.g., as described herein in connection with FIG. 8 and/or FIG. 11). In some examples, while the connection to the client device remains active during a time between the establishment of the connection and a termination of the connection, the server system provides notifications received from the one or more of the publishers to the client device, as the notifications are received by the server system from the one or more of the publishers.

At block 1310, the server system may delete, based on termination of the connection to the client device, the subscription filter from the server system (e.g., as described herein in connection with FIG. 9).

In one or more implementations, while the connection between the server system and the client device is active, the server system may receive an update to the subscription filter from the client device (e.g., as described herein in connection with FIG. 10). The server system may also receive additional notifications from a plurality of publishers. The server system may also identify a subset of the additional notifications received from one or more of the plurality of publishers and/or a plurality of corresponding channels indicated in the update to the subscription filter. The server system may also provide the subset of the additional notifications from the server system to the client device (e.g., as described herein in connection with FIG. 10). In some examples, the update is due to a user change provided to the client device. In some examples, the update is a change to channels subscribed and/or categories subscribed by the client device.

In one or more implementations, notifications from publishers may be received at the server system, in which the notifications are associated with one of the publishers and one or more categories (e.g., sports, politics, money, device type, operating system, etc.). The subscription filter may identify at least one of the publishers and at least one category associated with the at least one of the publishers. For example, the subscription filter may include a channel identifier that corresponds to a category of notifications from a particular publisher, and/or may include a channel identifier that identifies the publisher, and additional filter information for filtering notifications from that publisher per category.

In one or more implementations, the server systems includes a primary server (e.g., primary server 150) and an edge server (e.g., server 120). The primary server may receive notifications from one or more publishers, and may send a subset of the notifications to the edge server (e.g., as described above in connection with FIG. 11). For example, the subset may be based on multiple subscription filters received by the edge server from multiple client devices that are connected to the edge server. In some examples, the multiple subscription filters are not provided from the edge server to the primary server.

Sending the subset of the notifications to the edge server may include sending a particular notification of the notifications to the edge server based on a determination, by the primary server, that at least one of the multiple client devices connected to the edge server is subscribed to a channel corresponding to the particular notification. For example, the primary server may determine that at least one client device that is connected to the edge server is subscribed to a particular channel by receiving a channel identifier for that channel from the edge server (e.g., as described above in connection with FIG. 11). The edge server may provide the channel identifier for that channel from the edge server after identifying the channel identifier in the subscription filter received from one or more client devices that are currently connected to the edge server.

In one or more implementations, one of the set of notifications is indicated by a publisher as a notification for a device type. Identifying the set of notifications using the subscription filter may include detecting a type of the client device upon establishment of the connection between the server system and the client device (e.g., using connection information provided by the client device upon connection and/or within network communications to the server system). Identifying the set of notifications using the subscription filter may also include identifying the one of the set of notifications using the subscription filter and based on a determination that the type of the client device corresponds to the device type indicated by the publisher for the one of the set of notifications.

In one or more implementations, the subscription filter may include a time stamp (e.g., a time stamp 1200) for each of one or more notification channels and/or categories. Identifying the set of notifications using the subscription filter may include identifying notifications received at the server system for each of the one or more channels and/or categories since a time corresponding to the time stamp for that category in the subscription filter.

In one or more implementations, after the termination of the connection between the client device and the server system, the server system may establish a new connection between the server system and the client device (e.g., when the client device powers back on or reconnects to the Internet). The server system may receive a new version of the subscription filter from the client device upon establishing the new connection (e.g., as described above in connection with FIG. 10 and/or FIG. 12). In one or more implementations, the new version of the subscription filter may include a time stamp corresponding to a time of a last notification provided to the client device while the client device was previously connected to the server system. The server system may identify, using the new version of subscription filter and the time stamp, a new set of notifications received at the server system (e.g., from one or more publisher servers 160 or publisher devices such as electronic device 115, electronic device 117, and/or electronic device 119) between a current time and the time of the last notification corresponding to time stamp. The server system may provide the new set of notifications to the client device. In some examples, the client device updates the time stamp for each category and/or channel after receiving the set of notifications and/or upon disconnection from the server system. In one or more implementations, the server system is stateless and does not store the subscription filters for the client devices, the last message information, or any other information about the subscriptions or the state of the subscriptions for any individual device or user.

Figure 14:
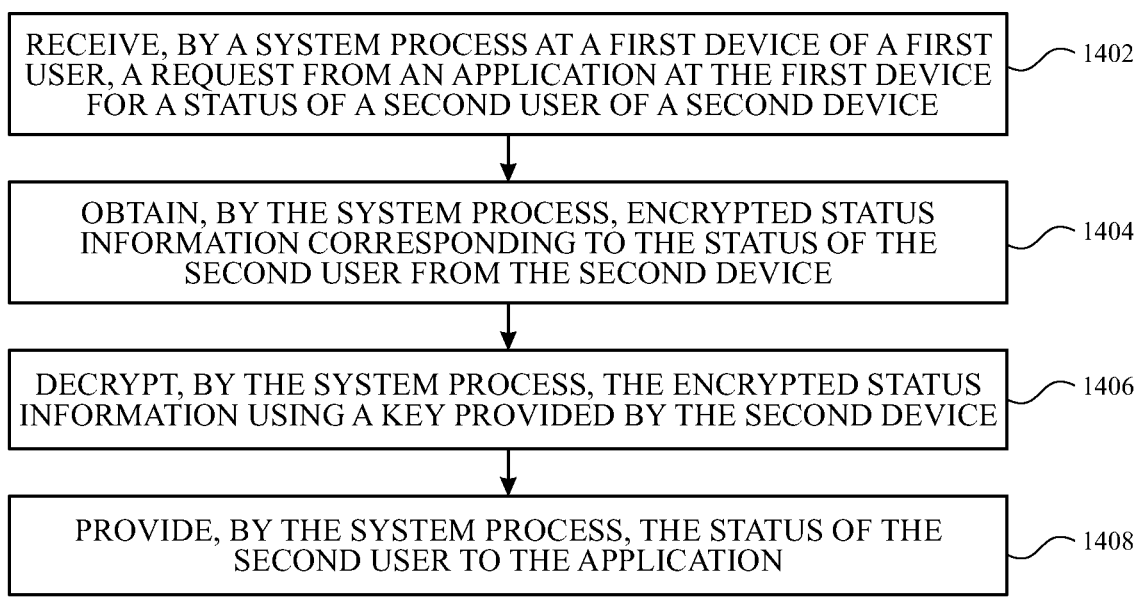
FIG. 14 illustrates a flow diagram of an example process for publication of and/or subscription to status information in accordance with one or more implementations.

FIG. 14 illustrates a flow diagram of an example process 1400 for providing status subscriptions, in accordance with one or more implementations. For explanatory purposes, the process 1400 is primarily described herein with reference to the components of FIG. 1 (particularly with reference to electronic device 117), which may be executed by one or more processors of the electronic device 117 of FIG. 1. However, the process 1400 is not limited to the electronic device 117, and one or more blocks (or operations) of the process 1400 may be performed by one or more other components of other suitable devices, such as one or more of the electronic device 110, the electronic device 115, the electronic device 119, and/or one or more servers such as the server 120, the server 130, and/or the server 150. Further for explanatory purposes, the blocks of the process 1400 are described herein as occurring in serial, or linearly. However, multiple blocks of the process 1400 may occur in parallel. In addition, the blocks of the process 1400 need not be performed in the order shown and/or one or more blocks of the process 1400 need not be performed and/or can be replaced by other operations.

In the example process 1400, at block 1402, a system process (e.g., system process 600 of FIG. 6) at a first device (e.g., electronic device 117) of a first user, receives a request from an application (e.g., application 602) at the first device for a status of a second user of a second device (e.g., electronic device 115). In one or more implementations, the application is a messaging application that requests the status from the system process when the first user initiates a messaging session with the second user with the messaging application. In other implementations, the application may be a photos application, a contacts application, or any other application that may generate, obtain, process, and/or display information related to the second user.

At block 1404, the system process obtains (e.g., from subscribed-channels data 606 stored by the system process or from the second device, such as subscribed-channels data from a channel corresponding to the Channel A ID, as shown in FIG. 6), encrypted status information (e.g., encrypted data 614) corresponding to the status of the second user from the second device. In various examples, the encrypted status information obtained from the second device may include the status of the second user, or may include information for determining the status of the second user at the first device. In one or more implementations, the status information includes multiple status identifiers, and the system process at the first device determines the status using the multiple status identifiers prior to providing the status to the application. In some examples, the status is a busy status or an available status. In some examples, the multiple status identifiers include an availability status, a calendar status, and a location status for the second user.

At block 1406, the system process decrypts the encrypted status information using a key (e.g., a key 612 such as Key A of FIG. 6) provided by the second device. For example, prior to obtaining the encrypted status information from the second device, the first device may receive the key at the system process from the second device (e.g., using the operations described above in connection with the example of electronic device 115 providing the key to electronic device 119 in FIG. 3). The system process may store the key at the first device (e.g., in the subscribed-channel data 606) for access by the system process. In some examples, the key is a ratcheted key that only allows decryption of encrypted status information published by the second device and/or received from the second device after the first device receives the key.

In one or more implementations, prior to obtaining the encrypted status information from the second device, the system process may receive a channel identifier (e.g., a channel identifier 608, such as Channel A ID of FIG. 6) from the second device (e.g., using the operations described above in connection with the example of electronic device 115 providing the Channel ID to the electronic device 119 in FIG. 3). In this example, the channel identifier identifies a status publication channel of the second device (e.g., a channel by which the second devices publishes status information to one or more subscriber devices). As described above in connection with FIG. 6, the system process may store the channel identifier (e.g., in the subscribed-channel data 606). In one or more implementations, obtaining the encrypted status information may include obtaining the encrypted status information from a publication server (e.g., server 120 and/or server 150) over the status publication channel of the second device by providing a request, including the channel identifier, from the first device to the publication server (e.g., as described above in connection with FIGS. 5, 8, 10, and/or 11).

At block 1408, the system process may provide the status of the second user to the application. The application may, for example, derive further status information from the provided status, and/or may include the status in information to be displayed in a user interface of the application at the first device (e.g., to allow the first user of the first device to view the status of the second user of the second device, based on the explicit permission of the second user provided before the second device transmits any status information and before the first device receives any status information for that user).

In one or more implementations, the system process may also publish a status of the first user to an invited subscriber device (e.g., electronic device 110 or electronic device 119) of another user (e.g., after receiving explicit permission from the first user to publish the status of the first user). For example, publishing the status of the first user may include providing an encrypted version of the status of the first user (e.g., encrypted data 614 of the owned-channel data 604 of FIG. 6) to a publication server (e.g., server 120 and/or server 150) with a channel token (e.g., a channel ownership token 610, such as Channel C Ownership Token of FIG. 6) corresponding to a publication channel of the first user.

In one or more implementations, prior to providing the encrypted version of the status of the first user and the channel token to the publication server, the first device may provide a key (e.g., a key 612 such as Key C of FIG. 6) and a channel identifier (e.g., a channel identifier such as Channel C ID of FIG. 6) of the publication channel of the first user from the system process to the invited subscriber device (e.g., using the operations described above in connection with the example of electronic device 115 providing the key and the Channel ID to the electronic device 119 in FIG. 3).

In one or more implementations, prior to providing the key and the channel identifier of the publication channel of the first user to the invited subscriber device, the system process of the first device may establish the publication channel of the first user with the publication server. Establishing the publication channel may include authenticating an account of the first user and/or obtaining the channel token and the channel identifier of the publication channel of the first user from the publication server (e.g., using the operations described above in connection with the example of electronic device 115 in FIG. 2). In some examples, authenticating an account of the first user may be achieved by providing an account token to the server, the account token received at the first device upon sign in of the first device to the account. In one or more implementations, the system process at the first device may also provide the channel identifier, the key, and the channel token to at least one additional device of the first user that is signed into the account of the first user (e.g., using the operations described above in connection with the example of electronic device 115 providing the channel ownership token to the electronic device 117 in FIG. 2). In one or more implementations, the second device may later be uninvited from receiving the encrypted status information for the first user of the first device, such as by rolling or otherwise changing the key corresponding to the encrypted status information and provided the rolled and/or updated key to any still-invited and/or newly invited subscriber devices.

Figure 15:
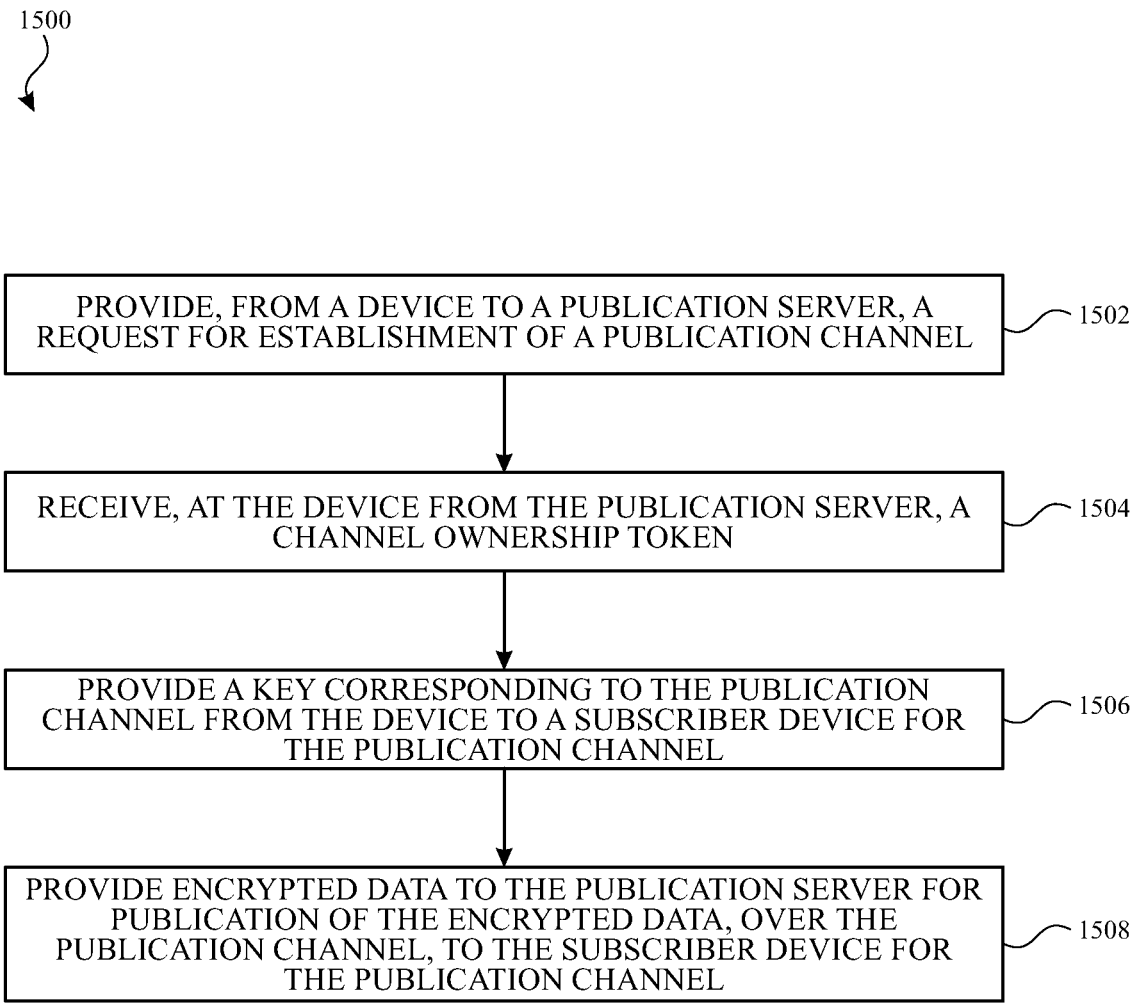
FIG. 15 illustrates a flow diagram of an example process for establishing a publication channel in accordance with one or more implementations.

FIG. 15 illustrates a flow diagram of an example process 1500 for establishing a publication channel, in accordance with one or more implementations. For explanatory purposes, the process 1500 is primarily described herein with reference to the components of FIG. 1 (particularly with reference to electronic device 115), which may be executed by one or more processors of the electronic device 115 of FIG. 1. However, the process 1500 is not limited to the electronic device 115, and one or more blocks (or operations) of the process 1500 may be performed by one or more other components of other suitable devices, such as one or more of the electronic device 110, the electronic device 117, the electronic device 119, and/or one or more servers such as the server 120, the server 130, and/or the server 150.

Further for explanatory purposes, the blocks of the process 1500 are described herein as occurring in serial, or linearly. However, multiple blocks of the process 1500 may occur in parallel. In addition, the blocks of the process 1500 need not be performed in the order shown and/or one or more blocks of the process 1500 need not be performed and/or can be replaced by other operations.

In the example process 1500, at block 1502, a device (e.g., electronic device 115) may provide, to a publication server (e.g., server 120), a request for establishment of a publication channel. The request may include, for example, a channel topic for the publication channel and/or authenticating information for an account associated with the device (e.g., an account of a user of the device).

At block 1504, the device may receive, from the publication server, a channel ownership token (e.g., as discussed above in connection with FIG. 2). For example, the channel ownership token may be a data blob (e.g., a data string) that is based on a channel identifier for the publication channel, a user identifier of a user of the device, and/or a channel topic for the publication channel. For example, in one or more implementations, prior to receiving the channel ownership token at the device, the device may provide account authentication information for an account of a user of the device to the publication server. Providing the account information may include, for example, providing authentication information (e.g., a password or biometric authentication information) to the publication server, or providing an account token previously received at the device upon previously signing into the account (e.g., using the password or the biometric information) with the device. In one or more implementations, the channel ownership token may be an ownership token for a single user of the device or may be a group channel ownership token that is co-owned by the user of the first device and/or one or more other users (e.g., family members). In an implementation in which the channel is co-owned, the group channel ownership token may be based on (e.g., may include or be derived from) a group identifier for a group of users, and/or based on multiple user identifiers of the users of the group.

In one or more implementations, the publication server does not store information indicating ownership of the channel. For example, ownership of the channel may be enforced with each publication from the device (and/or other devices associated with the same account) using the channel ownership token that is provided to the publication server with each publication.

At block 1506, the device may provide a key corresponding to the publication channel, from the device to a subscriber device for the publication channel (e.g., as described above in connection with electronic device 115 and electronic device 119 of FIG. 3). In some examples, the key is a symmetric key, and the device encrypts data to form the encrypted data using a version of the symmetric key. In some examples, the symmetric key that is provided to the subscriber device is a ratcheted key that only allows decryption of encrypted data encrypted after the generation of the symmetric key. In one or more implementations, the device is associated with a first user and the subscriber device is associated with a second user different from the first user. In one or more implementations, the device may also provide the channel ownership token to one or more other devices of the first user (e.g., other devices that are signed in, such as with the server or another server, to the same user account as the device, as described above in connection with electronic device 115 and electronic device 117 of FIG. 3).

At block 1508, the device may provide encrypted data to the publication server (e.g., as described above in connection with FIG. 4, FIG. 7, and/or FIG. 11) for publication of the encrypted data, over the publication channel, to the subscriber device for the publication channel (e.g., as described above in connection with FIG. 5, FIG. 8, FIG. 10, and/or FIG. 11). In one or more implementations, the encrypted data includes encrypted status information for a user of the device (e.g., as described above in connection with FIG. 6). In one or more implementations, prior to providing the encrypted data to the publication server, the device may generate the key, and may provide the key and a channel identifier for the publication channel to the subscriber device (e.g., as described above in connection with electronic device 115 and electronic device 119 of FIG. 3). In one or more implementations, providing the key and the channel identifier to the subscriber device may include providing the channel identifier and the key to the subscriber device in a subscription invitation message from the device to the subscriber device. In one or more implementations, the key and the channel identifier may be provided to the subscriber device via a different server (e.g., a messaging server or other server) from the server to which data encrypted using the key is to be published.

In one or more implementations, providing the encrypted data to the publication server for publication may include providing a publication request to the publication server, the publication request including the account token (from a previous login to the account at the device), and the channel token to prove ownership of the channel. For example, the publication server and/or one or more other servers in communication with the publication server may verify the account, obtain a user identifier for the account, verify the channel ownership token using the attributes of the channel token, determine that the user and/or device requesting publication (e.g., the user identified by the user identifier) owns the channel (e.g., the user identifier obtained using the account token is the same as the user identifier in the channel ownership token), and then send the requested publications to subscribers of that channel.

As described herein, aspects of the subject technology may include the collection and transfer of data from an application to other users' computing devices. The present disclosure contemplates that in some instances, this collected data may include personal information data that uniquely identifies or can be used to identify a specific person. Such personal information data can include demographic data, status data, location-based data, calendar data, online identifiers, telephone numbers, email addresses, voice data, audio data, video data, home addresses, images, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in providing publication and subscription services including publication of and subscription of user status information. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing publication and subscription services including publication of and subscription of user status information, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 16:
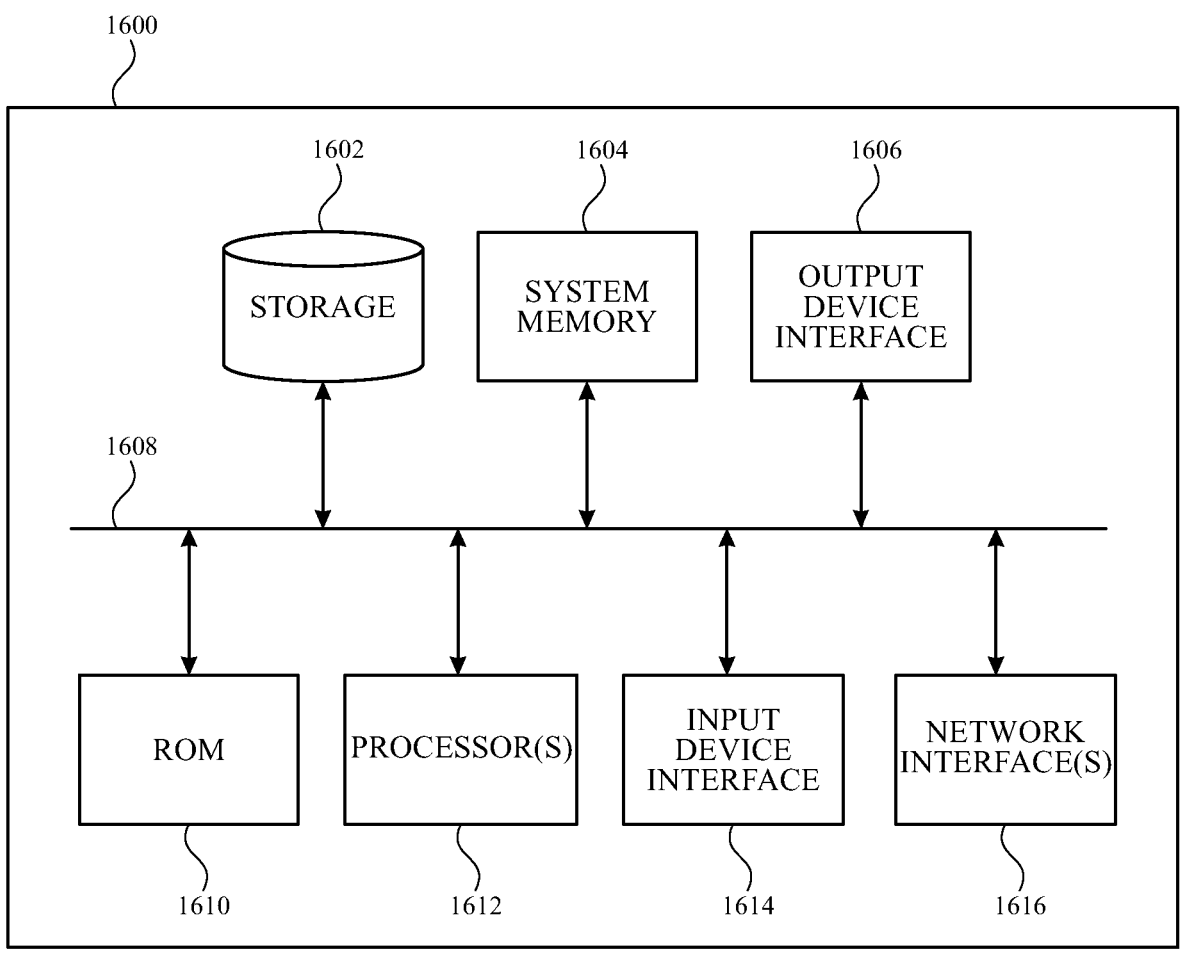
FIG. 16 illustrates an electronic system with which one or more implementations of the subject technology may be implemented.

FIG. 16 illustrates an electronic system 1600 with which one or more implementations of the subject technology may be implemented. The electronic system 1600 can be, and/or can be a part of, the electronic device 110, the electronic device 110, the electronic device 117, the electronic device 119, the server 120, the server 130, the server 150, and/or the publisher server 160 shown in FIG. 1. The electronic system 1600 may include various types of computer readable media and interfaces for various other types of computer readable media. The electronic system 1600 includes a bus 1608, one or more processing unit(s) 1612, a system memory 1604 (and/or buffer), a ROM 1610, a permanent storage device 1602, an input device interface 1614, an output device interface 1606, and one or more network interfaces 1616, or subsets and variations thereof.

The bus 1608 collectively represents all system, peripheral, and chipset buses that communicatively connect the numerous internal devices of the electronic system 1600. In one or more implementations, the bus 1608 communicatively connects the one or more processing unit(s) 1612 with the ROM 1610, the system memory 1604, and the permanent storage device 1602. From these various memory units, the one or more processing unit(s) 1612 retrieves instructions to execute and data to process in order to execute the processes of the subject disclosure. The one or more processing unit(s) 1612 can be a single processor or a multi-core processor in different implementations.

The ROM 1610 stores static data and instructions that are needed by the one or more processing unit(s) 1612 and other modules of the electronic system 1600. The permanent storage device 1602, on the other hand, may be a read-and-write memory device. The permanent storage device 1602 may be a non-volatile memory unit that stores instructions and data even when the electronic system 1600 is off. In one or more implementations, a mass-storage device (such as a magnetic or optical disk and its corresponding disk drive) may be used as the permanent storage device 1602.

In one or more implementations, a removable storage device (such as a floppy disk, flash drive, and its corresponding disk drive) may be used as the permanent storage device 1602. Like the permanent storage device 1602, the system memory 1604 may be a read-and-write memory device. However, unlike the permanent storage device 1602, the system memory 1604 may be a volatile read-and-write memory, such as random access memory. The system memory 1604 may store any of the instructions and data that one or more processing unit(s) 1612 may need at runtime. In one or more implementations, the processes of the subject disclosure are stored in the system memory 1604, the permanent storage device 1602, and/or the ROM 1610. From these various memory units, the one or more processing unit(s) 1612 retrieves instructions to execute and data to process in order to execute the processes of one or more implementations.

The bus 1608 also connects to the input and output device interfaces 1614 and 1606. The input device interface 1614 enables a user to communicate information and select commands to the electronic system 1600. Input devices that may be used with the input device interface 1614 may include, for example, alphanumeric keyboards and pointing devices (also called "cursor control devices"). The output device interface 1606 may enable, for example, the display of images generated by electronic system 1600. Output devices that may be used with the output device interface 1606 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 16, the bus 1608 also couples the electronic system 1600 to one or more networks and/or to one or more network nodes, through the one or more network interface(s) 1616. In this manner, the electronic system 1600 can be a part of a network of computers (such as a LAN, a wide area network ("WAN"), or an Intranet, or a network of networks, such as the Internet. Any or all components of the electronic system 1600 can be used in conjunction with the subject disclosure.

In accordance with various aspects of the subject disclosure, a device is provided that includes a memory and one or more processors configured to perform one or more of the methods, processes, and/or operations described herein.

In accordance with various aspects of the subject disclosure, a non-transitory computer-readable medium is provided that includes instructions, which when executed by at least one computing device, cause the at least one computing device to perform one or more of the methods, processes, and/or operations described herein.

In accordance with various aspects of the subject disclosure, a method is provided that includes, establishing, by a server system, a connection to a client device; receiving a subscription filter at the server system from the client device upon establishing the connection; identifying, by the server system using the subscription filter, a set of notifications; providing the set of notifications from the server system to the client device; and deleting, based on termination of the connection to the client device, the subscription filter from the server system.

In accordance with various aspects of the subject disclosure, a method is provided that includes providing, from a device to a publication server, a request for establishment of a publication channel; receiving, at the device from the publication server, a channel ownership token; providing a key corresponding to the publication channel from the device to a subscriber device for the publication channel; and providing encrypted data to the publication server for publication of the encrypted data, over the publication channel, to the subscriber device for the publication channel.

In accordance with various aspects of the subject disclosure, a method is provided that includes receiving, by a system process at a first device of a first user, a request from an application at the first device for a status of a second user of a second device; obtaining, by the system process, encrypted status information corresponding to the status of the second user from the second device; decrypting, by the system process, the encrypted status information using a key provided by the second device; and providing, by the system process, the status of the second user to the application.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    establishing, by a server system, a connection to a client device;
    receiving a subscription filter at the server system from the client device upon establishing the connection;
    identifying, by the server system using the subscription filter, a set of notifications;
    providing the set of notifications from the server system to the client device;
    deleting, upon termination of the connection to the client device, the subscription filter from the server system; and
    after the termination of the connection between the client device and the server system:
        establishing a new connection between the server system and the client device;
        receiving a new version of the subscription filter at the server system from the client device upon establishing the new connection, the new version of the subscription filter including a time stamp corresponding to a time of a last notification provided to the client device while the client device was previously connected to the server system;
        identifying, by the server system using the new version of the subscription filter and the time stamp, a new set of notifications received at the server system between a current time and the time of the last notification corresponding to time stamp; and
        providing the new set of notifications from the server system to the client device.

2. The method of claim 1, further comprising receiving, at the server system, a plurality of notifications from a plurality of publishers, wherein the subscription filter identifies one or more channels corresponding to one or more of the plurality of publishers, and wherein identifying the set of notifications includes identifying a subset of the plurality of notifications that have been received by the server system over the one or more channels.

3. The method of claim 1, further comprising, while the connection between the server system and the client device is active:
   receiving an update to the subscription filter at the server system from the client device;
   receiving additional notifications from a plurality of publishers;
   identifying a subset of the additional notifications received from one or more of the plurality of publishers indicated in the update to the subscription filter; and
   providing the subset of the additional notifications from the server system to the client device.

4. The method of claim 1, further comprising receiving, at the server system, a plurality of notifications from a plurality of publishers, wherein each of the plurality of notifications is associated with one of the plurality of publishers and one or more categories, and wherein the subscription filter identifies at least one of the plurality of publishers and at least one category associated with the at least one of the plurality of publishers.

5. The method of claim 1, wherein the server system comprises a primary server and an edge server, the method further comprising:
   receiving, by the primary server, a plurality of notifications from a plurality of publishers; and
   sending a subset of the plurality of notifications to the edge server, the subset based on multiple subscription filters received by the edge server from multiple client devices that are connected to the edge server.

6. The method of claim 5, wherein sending the subset of the plurality of notifications to the edge server comprises sending a particular notification of the plurality of notifications to the edge server based on a determination, by the primary server, that at least one of the multiple client devices connected to the edge server is subscribed to a channel corresponding to the particular notification.

7. The method of claim 1, wherein one of the set of notifications is indicated by a publisher as a notification for a device type, and wherein identifying the set of notifications using the subscription filter includes:
   detecting a type of the client device upon establishment of the connection between the server system and the client device; and
   identifying the one of the set of notifications using the subscription filter and based on a determination that the type of the client device corresponds to the device type indicated by the publisher for the one of the set of notifications.

8. The method of claim 1, wherein the subscription filter includes a time stamp for each of one or more notification categories, and wherein identifying the set of notifications using the subscription filter comprises identifying notifications received at the server system for each of the one or more notification categories since a time corresponding to the time stamp for that category in the subscription filter.

9. A server system, comprising:
   a memory; and
   one or more processors configured to:
      establish a connection to a client device;
      receive a subscription filter from the client device upon establishing the connection;
      identify, using the subscription filter, a set of notifications;
      provide the set of notifications to the client device; and
      delete, in response to termination of the connection to the client device, the subscription filter from the server system; and
      after the termination of the connection between the client device and the server system:
         establish a new connection between the server system and the client device;
         receive a new version of the subscription filter at the server system from the client device upon establishing the new connection, the new version of the subscription filter including a time stamp corresponding to a time of a last notification provided to the client device while the client device was previously connected to the server system;
         identify, by the server system using the new version of the subscription filter and the time stamp, a new set of notifications received at the server system between a current time and the time of the last notification corresponding to time stamp; and
         provide the new set of notifications from the server system to the client device.

10. The server system of claim 9, wherein the one or more processors are further configured to receive, at the server system, a plurality of notifications from a plurality of publishers, wherein the subscription filter identifies one or more channels corresponding to one or more of the plurality of publishers, and to identify the set of notifications by identifying a subset of the plurality of notifications that have been received by the server system over the one or more channels.

11. The server system of claim 9, wherein the one or more processors are further configured to, while the connection between the server system and the client device is active:
   receive an update to the subscription filter from the client device;
   receive additional notifications from a plurality of publishers;
   identify a subset of the additional notifications received from one or more of the plurality of publishers indicated in the update to the subscription filter; and
   provide the subset of the additional notifications to the client device.

12. The server system of claim 9, wherein the one or more processors are further configured to receive, at the server system, a plurality of notifications from a plurality of publishers, wherein each of the plurality of notifications is associated with one of the plurality of publishers and one or more categories, and wherein the subscription filter identifies at least one of the plurality of publishers and at least one category associated with the at least one of the plurality of publishers.

13. The server system of claim 9, wherein the server system comprises a primary server and an edge server, wherein the primary server is configured to:
   receive a plurality of notifications from a plurality of publishers; and
   send a subset of the plurality of notifications to the edge server, the subset based on multiple subscription filters received by the edge server from multiple client devices that are connected to the edge server.

14. The server system of claim 13, wherein the primary server is configured to send the subset of the plurality of notifications to the edge server by sending a particular notification of the plurality of notifications to the edge server based on a determination, by the primary server, that at least one of the multiple client devices connected to the edge server is subscribed to a channel corresponding to the particular notification.

15. The server system of claim 9, wherein one of the set of notifications is indicated by a publisher as a notification for a device type, and wherein the one or more processors are configured to identify the set of notifications using the subscription filter by:
  detecting a type of the client device upon establishment of the connection between the server system and the client device; and
  identifying the one of the set of notifications using the subscription filter and based on a determination that the type of the client device corresponds to the device type indicated by the publisher for the one of the set of notifications.

16. The server system of claim 9, wherein the subscription filter includes a time stamp for each of one or more notification categories, and wherein the one or more processors are configured to identify the set of notifications using the subscription filter by identifying notifications received at the server system for each of the one or more notification categories since a time corresponding to the time stamp for that category in the subscription filter.

17. A non-transitory computer-readable medium is provided that includes instructions, which when executed by at least one computing device, cause the at least one computing device to perform operations comprising:
  establishing, by a server system, a connection to a client device;
  receiving a subscription filter at the server system from the client device upon establishing the connection;
  identifying, by the server system using the subscription filter, a set of notifications;
  providing the set of notifications from the server system to the client device; and
  deleting, in response to termination of the connection to the client device, the subscription filter from the server system; and
  after the termination of the connection between the client device and the server system:
    establishing a new connection between the server system and the client device;
    receiving a new version of the subscription filter at the server system from the client device upon establishing the new connection, the new version of the subscription filter including a time stamp corresponding to a time of a last notification provided to the client device while the client device was previously connected to the server system;
    identifying, by the server system using the new version of the subscription filter and the time stamp, a new set of notifications received at the server system between a current time and the time of the last notification corresponding to time stamp; and
    providing the new set of notifications from the server system to the client device.

18. The non-transitory computer-readable medium of claim 17, wherein the operations further comprise:
  receiving, at the server system, a plurality of notifications from a plurality of publishers, wherein the subscription filter identifies one or more channels corresponding to one or more of the plurality of publishers, and wherein identifying the set of notifications includes identifying a subset of the plurality of notifications that have been received by the server system over the one or more channels.

19. The non-transitory computer-readable medium of claim 17, wherein the operations further comprise:
  while the connection between the server system and the client device is active:
    receiving an update to the subscription filter at the server system from the client device;
    receiving additional notifications from a plurality of publishers;
    identifying a subset of the additional notifications received from one or more of the plurality of publishers indicated in the update to the subscription filter; and
    providing the subset of the additional notifications from the server system to the client device.

* * * * *